United States Patent
J S

(10) Patent No.: US 11,412,006 B1
(45) Date of Patent: Aug. 9, 2022

(54) LAWFULLY INTERCEPTING TRAFFIC AND PROVIDING THE TRAFFIC TO A CONTENT DESTINATION BASED ON CONTENT DESTINATION AVAILABILITIES AND PRIORITIES

(71) Applicant: Juniper Networks, Inc., Sunnyvale, CA (US)

(72) Inventor: Sheeja J S, Bangalore (IN)

(73) Assignee: Juniper Networks, Inc., Sunnyvale, CA (US)

(*) Notice: Subject to any disclaimer, the term of this patent is extended or adjusted under 35 U.S.C. 154(b) by 22 days.

(21) Appl. No.: 16/588,023

(22) Filed: Sep. 30, 2019

(51) Int. Cl.
- *H04L 9/40* (2022.01)
- *H04L 45/74* (2022.01)
- *H04L 45/00* (2022.01)
- *H04L 45/302* (2022.01)

(52) U.S. Cl.
CPC .......... *H04L 63/306* (2013.01); *H04L 45/306* (2013.01); *H04L 45/566* (2013.01); *H04L 45/74* (2013.01); *H04L 63/0245* (2013.01); *H04L 63/166* (2013.01)

(58) Field of Classification Search
CPC ..... H04L 63/306; H04L 63/166; H04L 45/74; H04L 45/566; H04L 45/306; H04L 63/0245
See application file for complete search history.

(56) References Cited

U.S. PATENT DOCUMENTS

| | | | | |
|---|---|---|---|---|
| 7,046,663 | B1 * | 5/2006 | Temoshenko | H04L 12/2854 370/390 |
| 7,254,114 | B1 * | 8/2007 | Turner | H04L 45/60 370/252 |
| 7,747,737 | B1 * | 6/2010 | Apte | H04L 43/028 709/224 |
| 7,801,021 | B1 * | 9/2010 | Triantafillis | H04L 45/26 370/216 |
| 7,809,827 | B1 * | 10/2010 | Apte | H04L 45/10 709/224 |
| 8,037,175 | B1 * | 10/2011 | Apte | H04L 45/38 709/224 |
| 8,537,676 | B1 * | 9/2013 | Apte | H04L 69/16 370/232 |
| 8,605,629 | B1 * | 12/2013 | S | H04M 11/00 370/259 |

(Continued)

*Primary Examiner* — John A Follansbee
*Assistant Examiner* — Raqiul A Choudhury
(74) *Attorney, Agent, or Firm* — Harrity & Harrity, LLP

(57) ABSTRACT

A network device ensures availability of content destination devices, and may receive a request to install a filter, and the request may include information identifying a set of content destination devices capable of receiving packets that match the filter, and priority values indicating priorities by which the set of content destination devices are to receive the packets. The network device may receive status indications indicating availabilities associated with the set of content destination devices, and may receive a packet destined for an endpoint device. The network device may generate a copy of the packet, and may determine that a packet feature matches the filter. The network device may select a particular content destination device, from the set of content destination devices, based on the priority values and the status indications, and may cause the copy of the packet to be forwarded to the particular content destination device.

20 Claims, 18 Drawing Sheets

(56) References Cited

U.S. PATENT DOCUMENTS

| | | | | |
|---|---|---|---|---|
| 2011/0023090 A1* | 1/2011 | Asati | ............... | H04L 63/0272 |
| | | | | 726/4 |
| 2013/0311986 A1* | 11/2013 | Arrouye | ............... | H04L 67/06 |
| | | | | 717/175 |
| 2015/0319242 A1* | 11/2015 | Olster | ............... | G06F 11/2094 |
| | | | | 707/634 |
| 2018/0048567 A1* | 2/2018 | Ignatchenko | ....... | H04L 45/3065 |

* cited by examiner

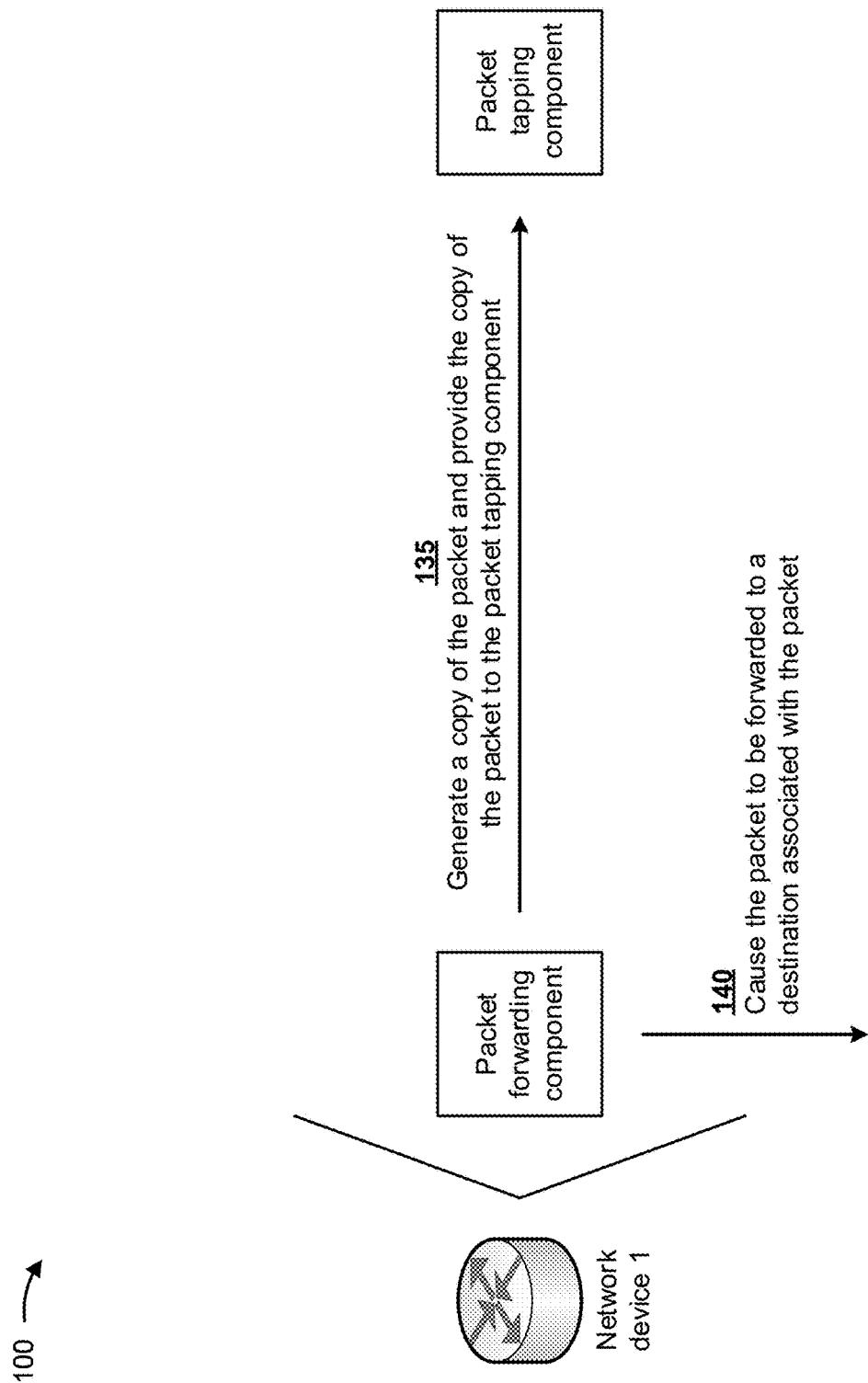

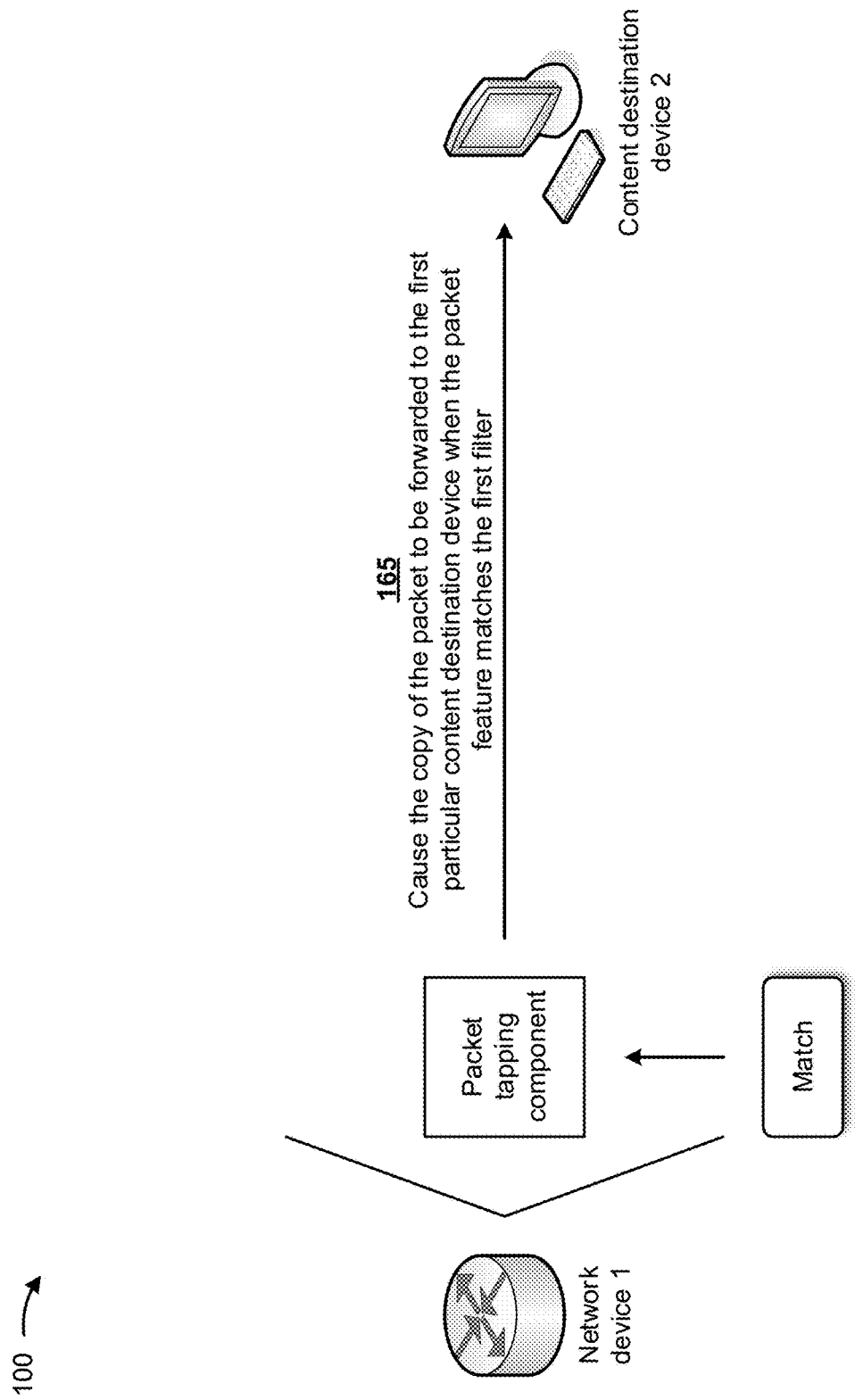

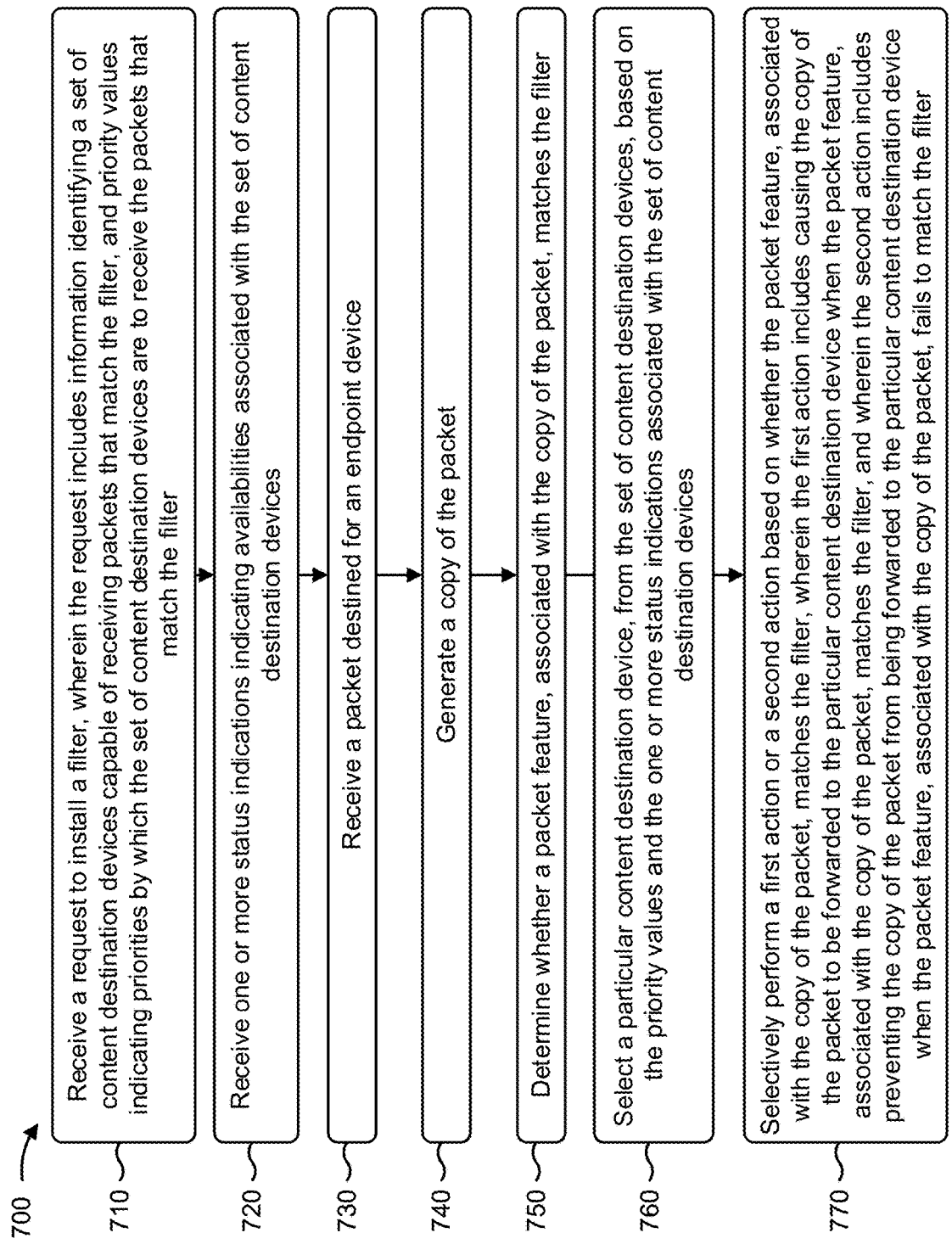

LAWFULLY INTERCEPTING TRAFFIC AND PROVIDING THE TRAFFIC TO A CONTENT DESTINATION BASED ON CONTENT DESTINATION AVAILABILITIES AND PRIORITIES

BACKGROUND

Lawful interception includes obtaining network traffic pursuant to a lawful authority for the purpose of analysis and/or evidence. Such traffic may include signaling or network management information or content of communications.

SUMMARY

According to some implementations, a method may include receiving a request to install a filter, wherein the request may include information identifying a set of content destination devices capable of receiving packets that match the filter, and priority values indicating priorities by which the set of content destination devices are to receive the packets that match the filter. The method may include adding, based on the request, information identifying the filter to a list of filters, and receiving one or more status indications indicating availabilities associated with respective content destination devices of the set of content destination devices. The method may include receiving a packet destined for an endpoint device, and generating a copy of the packet. The method may include determining whether a packet feature, associated with the copy of the packet, matches the filter, and selecting a particular content destination device, from the set of content destination devices, based on the priority values and the one or more status indications associated with the set of content destination devices. The method may include causing the copy of the packet to be forwarded to the particular content destination device when the packet feature, associated with the copy of the packet, matches the filter.

According to some implementations, a network device may include one or more memories, and one or more processors to receive a request to install a filter, wherein the request may include information identifying a set of content destination devices capable of receiving packets that match the filter, and priority values indicating priorities by which the set of content destination devices are to receive the packets that match the filter. The one or more processors may receive one or more status indications indicating availabilities associated with the set of content destination devices, and may receive a packet destined for an endpoint device. The one or more processors may generate a copy of the packet, and may determine whether a packet feature, associated with the copy of the packet, matches the filter. The one or more processors may select a particular content destination device, from the set of content destination devices, based on the priority values and the one or more status indications associated with the set of content destination devices, and may cause the copy of the packet to be forwarded to the particular content destination device when the packet feature, associated with the copy of the packet, matches the filter. The one or more processors may prevent the copy of the packet from being forwarded to the particular content destination device when the packet feature, associated with the copy of the packet, fails to match the filter or when the one or more status indications indicate that the set of content destination devices are unavailable.

According to some implementations, a non-transitory computer-readable medium may store one or more instructions that, when executed by one or more processors of a network device, may cause the one or more processors to receive a request to install a filter, wherein the request may include information identifying a set of content destination devices capable of receiving packets that match the filter, and priority values indicating priorities by which the set of content destination devices are to receive the packets that match the filter. The one or more instructions may cause the one or more processors to receive one or more status indications indicating availabilities associated with the set of content destination devices, and receive a packet destined for an endpoint device. The one or more instructions may cause the one or more processors to generate a copy of the packet, and determine whether a packet feature, associated with the copy of the packet, matches the filter. The one or more instructions may cause the one or more processors to select a particular content destination device, from the set of content destination devices, based on the priority values and the one or more status indications associated with the set of content destination devices, and selectively perform a first action or a second action based on whether the packet feature, associated with the copy of the packet, matches the filter. The first action may include causing the copy of the packet to be forwarded to the particular content destination device when the packet feature, associated with the copy of the packet, matches the filter. The second action may include preventing the copy of the packet from being forwarded to the particular content destination device when the packet feature, associated with the copy of the packet, fails to match the filter.

BRIEF DESCRIPTION OF THE DRAWINGS

FIGS. 1A-1L are diagrams of one or more example implementations described herein.

FIGS. 5-7 are flow charts of example processes for lawfully intercepting traffic and providing the traffic to a content destination based on content destination availabilities and priorities.

DETAILED DESCRIPTION

Figure 1A:
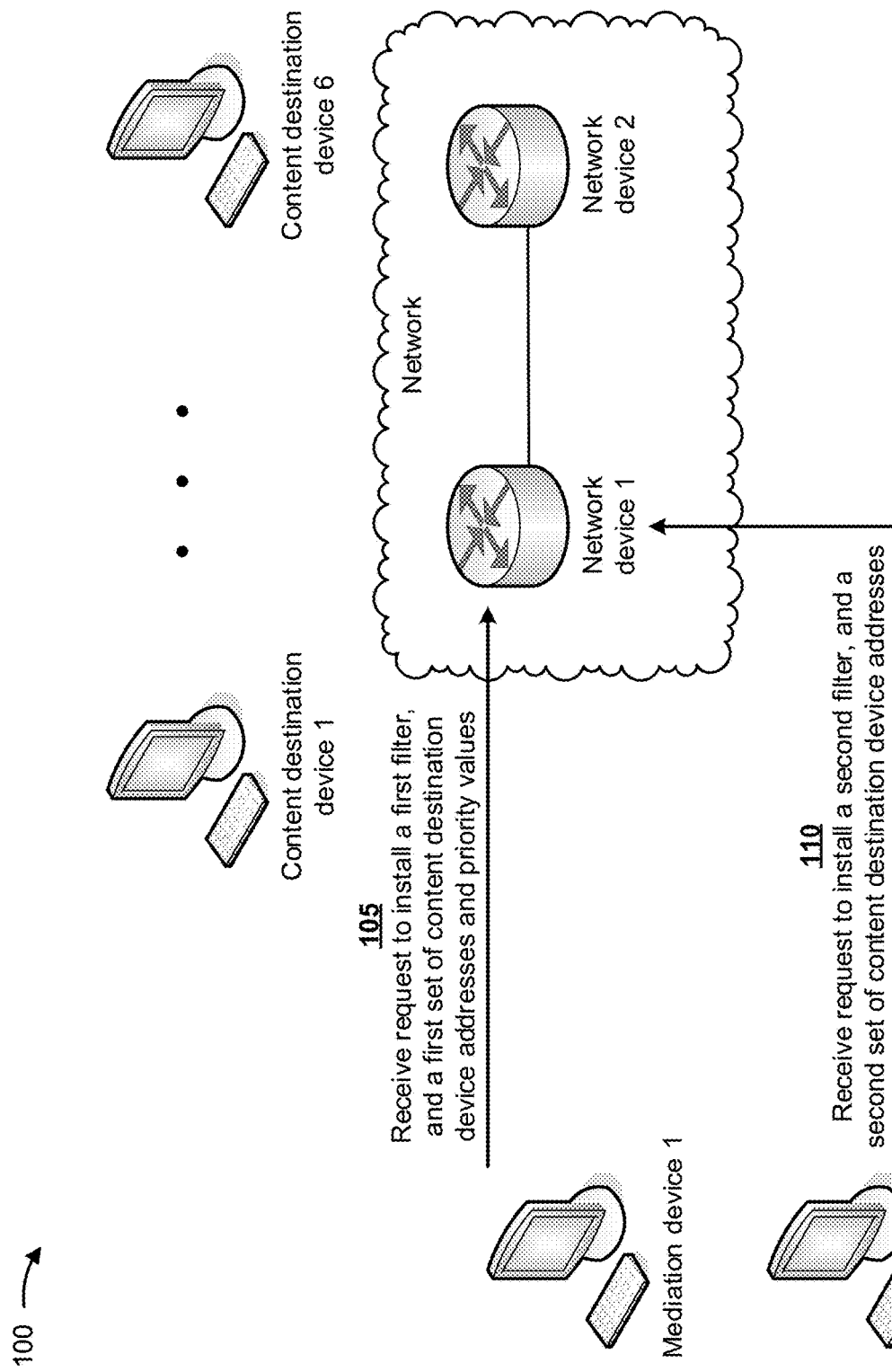

The following detailed description of example implementations refers to the accompanying drawings. The same reference numbers in different drawings may identify the same or similar elements.

Network traffic may be lawfully intercepted at a network device (e.g., a router, a firewall, and/or the like) via flow tapping. The flow tapping copies or mirrors traffic that passes between two network devices. The original traffic is forwarded to a destination and the copied traffic is forwarded to a content destination device that analyzes the copied traffic. The content destination device may include a content destination device identified by a law enforcement authority (e.g., a police department, a government agency, and/or the like). Network devices are only capable of tapping traffic (e.g., packets) based on a specific set of defined parameters, such as a source Internet protocol (IP) address, a destination IP address, a source port, a destination port, and/or the like.

However, if the content destination device is unavailable due to being inoperative or experiencing high load conditions, the network devices cannot provide the tapped traffic to the content destination device. This may result in the tapped traffic being lost. Thus, the network devices waste computing resources (e.g., processing resources, memory resources, and/or the like), communication resources, networking resources, and/or the like associated with collecting traffic for an unavailable content destination device, filtering traffic that may be eventually lost, and/or the like. Furthermore, if such traffic is lost and not monitored, bad actors may not be captured and may cause further waste of resources associated with handling malicious acts committed by the bad actors.

Some implementations described herein provide a network device that intercepts traffic and provides the traffic to a content destination based on content destination availabilities and priorities. For example, the network device may receive a request to install a filter, wherein the request may include information identifying a set of content destination devices capable of receiving packets that match the filter, and priority values indicating priorities by which the set of content destination devices are to receive the packets that match the filter. The network device may add, based on the request, information identifying the filter to a list of filters, and may receive one or more status indications indicating availabilities associated with respective content destination devices of the set of content destination devices. The network device may receive a packet destined for an endpoint device, and may generate a copy of the packet. The network device may determine whether a packet feature, associated with the copy of the packet, matches the filter, and may select a particular content destination device, from the set of content destination devices, based on the priority values and the one or more status indications associated with the set of content destination devices. The network device may cause the copy of the packet to be forwarded to the particular content destination device when the packet feature, associated with the copy of the packet, matches the filter.

In this way, network traffic may be intercepted for analysis and provided to an available content destination device based on availabilities and priorities associated with a set of content destination devices, which reduces or prevents network devices from collecting traffic for an unavailable content destination device, filtering traffic that may be eventually lost, and/or the like. This, in turn, conserves computing resources (e.g., processing resources, memory resources, and/or the like), communication resources, networking resources, and/or the like that would otherwise be wasted in collecting traffic for an unavailable content destination device, filtering traffic that may be eventually lost, and/or the like.

FIGS. 1A-1L are diagrams of one or more example implementations 100 described herein. As shown in FIG. 1A, a first mediation device (e.g., mediation device 1) and a second mediation device (e.g., mediation device 2) may communicate and exchange traffic with a network. The network may include multiple network devices (e.g., routers, gateways, and/or the like), such as a first network device (e.g., network device 1), a second network device (e.g., network device 2), and/or the like. The network devices may communicate with multiple content destination devices to which tapped traffic may be provided, as described herein. The multiple content destination devices may include a first content destination device (e.g., content destination device 1) through a sixth content destination device (e.g., content destination device 6). The two network devices shown in FIGS. 1A-1L are provided merely as examples of network devices, and, in practice, the network may include additional network devices. The mediation devices and/or the content destination devices may be associated with one or more entities or law enforcement authorities (e.g., police departments, government agencies, corporations, educational institutions, and/or the like) and may be utilized by the law enforcement authorities to request, from the network, particular traffic that is to be monitored for the purpose of analysis and/or evidence.

As further shown in FIG. 1A, and by reference number 105, the first network device may receive, from the first mediation device, a request to install a first filter. The request may also include information identifying a first set of content destination devices, addresses associated with the first set of content destination devices, priority values (e.g., indicating priorities associated with receipt of tapped traffic) associated with the first set of content destination devices, and/or the like. The first filter may include parameters used to identify traffic (e.g., packets) to tap, such as a source IP address, a destination IP address, a source port, a destination port, and/or the like. The first mediation device may include a device that requests specific traffic (e.g., electronic data and/or voice data transferred over the network) to be monitored based on the first filter.

A user of the first mediation device may define the first set of content destination devices, and may utilize the first mediation device to provide, via the request and to the first network device, the information identifying the first set of content destination devices, the addresses associated with the first set of content destination devices, the priority values associated with the first set of content destination devices, and/or the like. In some implementations, the first mediation device may provide such information via new fields (e.g., X-JTap-Cdest-Dest-Pool-Address: x,y,z and X-JTap-Cdest-Dest-Pool-Priority: 1,2,3, shown below in bold) provided in the request, as shown below:

```
ADD DTCP/0.8
Csource-ID: ftap1
Cdest-ID: cd1
Source-Address: 50.50.50.2
Dest-Address: 60.60.60.2
Source-Port: 1000
Dest-Port: 2000
Protocol: 17
Priority: 2
Flags: Static
X-JTap-Cdest-Dest-Pool-Address: x,y,z
X-JTap-Cdest-Dest-Pool-Priority: 1,2,3
X-JTap-Cdest-Dest-Port: 8001
X-JTap-Cdest-Source-Address: 208.223.208.9
X-JTap-Cdest-Source-Port: 49153
X-JTap-Input-Interface: xe-5/2/0:1
X-JTap-Cdest-TTL: 255
Seq: 1
Authentication-Info:
   e654b54414cabeedfd1266bc111971f365fe3314
```

In some implementations, the request to install the first filter may prevent identification of the first mediation device that generated the request to install the first filter. For example, the first mediation device may not be identified for security reasons, but may be permitted to access the network via a security mechanism (e.g., a security login). In some implementations, the first network device may provide, to the first mediation device, a response confirming that the request was received.

In some implementations, the first mediation device may send the request to install the first filter via a secure protocol (e.g., a dynamic tasking control protocol (DTCP)), and the first network device may receive the request to install the first filter via the DTCP. DTCP is a secure protocol that utilizes a message-based interface by which an authorized client can connect to a network device and issue dynamic requests for data. Such a request may contain, among other parameters, packet matching criteria that may apply to certain packets flowing through the network device, and may instruct the network device to perform mirroring (e.g., to send copies of packets matching the criteria to a specified location for further inspection or other action). Additionally, DTCP contains a security architecture to address client or server spoofing, as well as replay prevention.

In some implementations, the first mediation device may send the request as a DTCP ADD message. A DTCP ADD message may trigger mirroring of network traffic (e.g., matching the first filter criteria) by the first network device, and may include fields that trigger the first network device to begin mirroring packets, fields that identify where to send the mirrored packets, and/or the like. The DTCP ADD message may additionally include one or more fields that instruct the first network device to filter traffic that satisfies the parameters included in the first filter.

As further shown in FIG. 1A, and by reference number 110, the first network device may receive, from the second mediation device, a request to install a second filter. The second filter may include the features described in connection with the first filter. The request may also include information identifying a second set of content destination devices, addresses associated with the second set of content destination devices, priority values associated with the second set of content destination devices, and/or the like. The second mediation device may include a device that requests specific traffic (e.g., electronic data and/or voice data transferred over the network) to be monitored based on the second filter. A user of the second mediation device may define the second set of content destination devices, and may utilize the second mediation device to provide, via the request and to the first network device, the information identifying the second set of content destination devices, the addresses associated with the second set of content destination devices, the priority values associated with the second set of content destination devices, and/or the like.

In some implementations, the request to install the second filter may prevent identification of the second mediation device that generated the request to install the second filter. For example, the second mediation device may not be identified for security reasons, but may be permitted to access the network via a security mechanism (e.g., a security login). In some implementations, the first network device may provide, to the second mediation device, a response confirming that the request was received.

In some implementations, the second mediation device may send the request to install the second filter via a DTCP, and the first network device may receive the request to install the second filter via the DTCP, in a manner similar to that described above with respect to the first mediation device. In some implementations, the second mediation device may send the request as a DTCP ADD message. A DTCP ADD message may trigger mirroring of network traffic (e.g., matching the second filter criteria) by the first network device, and may include fields that trigger the first network device to begin mirroring packets, fields that identify where to send the mirrored packets, and/or the like. The DTCP ADD message may additionally include one or more fields that instruct the first network device to filter traffic that satisfies the parameters included in the second filter.

Although FIG. 1A shows two mediation devices and two content destination devices, in practice, the first network device may be associated with hundreds, thousands, and/or the like of mediation devices and/or content destination devices, and the mediation devices and/or content destination devices may be associated with hundreds, thousands, and/or the like of law enforcement authorities.

Figure 1B:
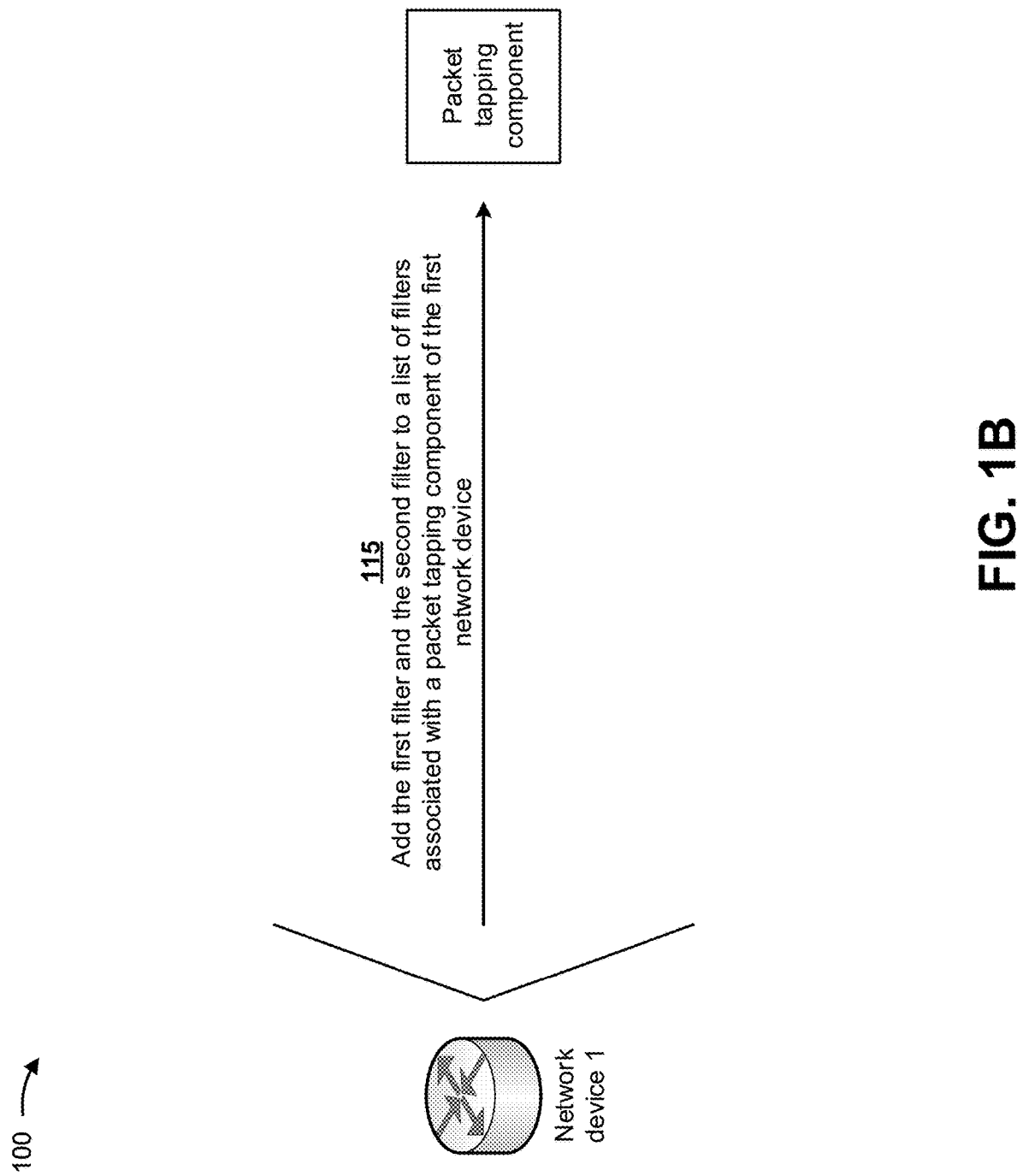

As shown in FIG. 1B, and by reference number 115, the first network device may add the first filter and the second filter to a list of filters associated with a packet tapping component (e.g., that performs packet inspection and packet tapping of packets, described below) of the first network device. For example, the first network device may store the first filter and the second filter in a data structure (e.g., a database, a table, a list, and/or the like), associated with the first network device, that maintains hundreds, thousands, millions, and/or the like of different filters. In this way, the first network device may implement filters that can identify packets that particular law enforcement authorities wish to monitor. In some implementations, filters installed for one entity (e.g., a law enforcement authority corresponding to one mediation device) may not be visible to other entities (e.g., other law enforcement authorities corresponding to other mediation devices), and the first network device may not reveal identities of monitored targets.

Figure 1C:
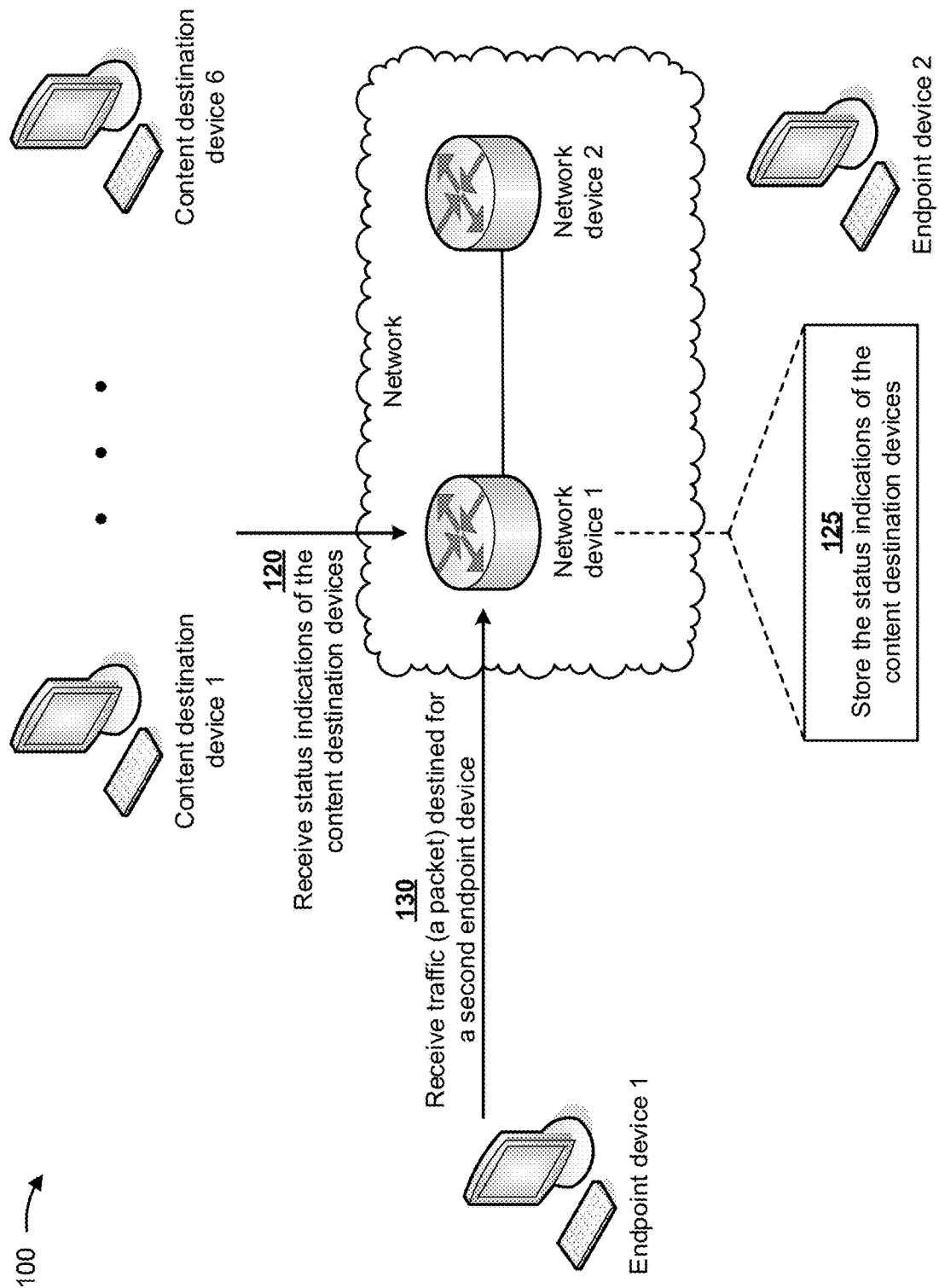

As shown in FIG. 1C, and by reference number 120, the first network device may receive status indications associated with the content destination devices. For example, the first network device may provide messages (e.g., keep alive check messages) to the content destination devices at predetermined time intervals. The messages may request that the content destination devices respond with the status indications. In some implementations, the status indications may include information indicating availabilities, load conditions, operability, and/or the like associated with the content destination devices (e.g., the content destination devices included in the first set and the second set of content destination devices).

As further shown in FIG. 1C, and by reference number 125, the first network device may store the status indications associated with the content destination devices. For example, the first network device may store the status indications associated with the first set of content destination devices and the second set of content destination devices in a data structure (e.g., a database, a table, a list, and/or the like) associated with the first network device. The first network device may periodically update the data structure when new status indications are received at the predetermined time intervals.

As further shown in FIG. 1C, and by reference number 130, the first network device may receive, from a first endpoint device (e.g., endpoint device 1), traffic (e.g., a packet) destined for a second endpoint device (e.g., endpoint device 2). The first endpoint device may be a source device providing electronic data and/or voice data over the network, and the second endpoint device may be a destination device for the electronic data and/or voice data. In some implementations, the first endpoint device and the second endpoint device may be parties to a voice conversation; the first endpoint device may include a server and the second endpoint device may include a client served by the server via electronic data transmitted over the network; the first endpoint device and the second endpoint device may be parties to a short message service (SMS) text message conversation; and/or the like. In some implementations, the packet may include signaling information (e.g., information for establishing, controlling, and/or terminating a communication, such as a telephone call), network management information (e.g., network performance information, network provisioning information, network quality of service information, and/or the like), content of communications, and/or the like.

As shown in FIG. 1D, and by reference number 135, a packet forwarding component of the first network device may generate a copy of the packet received from the first endpoint device, and may provide the copy of the packet to the packet tapping component. In some implementations, the packet forwarding component may filter a particular type of packet (e.g., content for which lawful interception is expected to be warranted and/or appropriate, such as an Internet search, a telephone call, a text messaging session, and/or the like), and may only copy the particular type of packet. In this way, the first network device conserves computing resources (e.g., processing resources, memory resources, and/or the like) that would otherwise be wasted copying and monitoring packets for which lawful interception is unlikely to be warranted or appropriate. Alternatively, the packet forwarding component may copy all packets received by the first network device (e.g., depending on traffic load associated with the first network device), and may provide the copies of all packets received to the packet tapping component, which may conserve computing resources that would otherwise be wasted filtering packets prior to packet tapping during light traffic load conditions.

As further shown in FIG. 1D, and by reference number 140, the packet forwarding component may cause the packet to be forwarded toward a destination associated with the packet. For example, the packet forwarding component may cause the packet to be forwarded toward the second endpoint device.

Figure 1E:
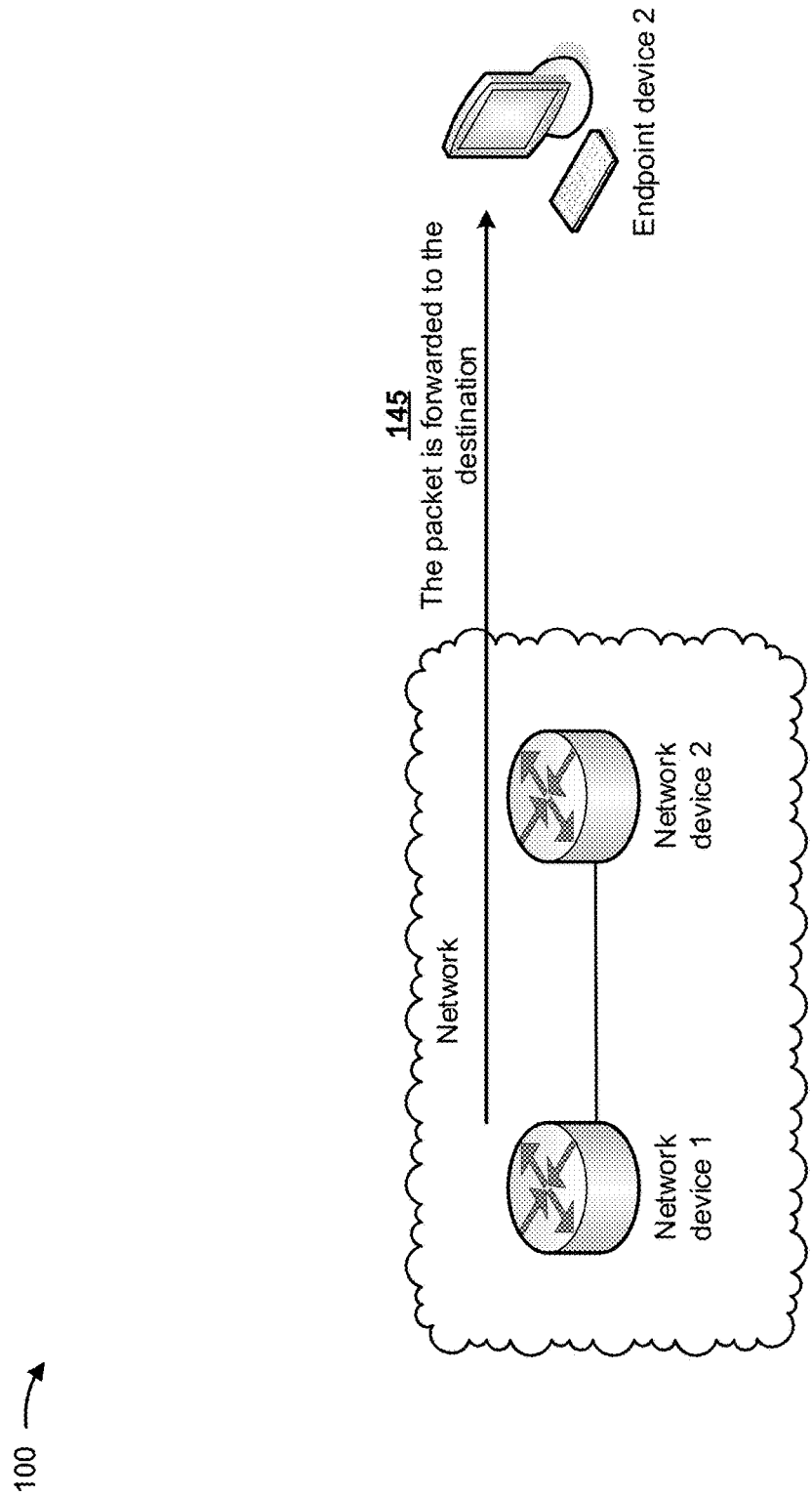

As shown in FIG. 1E, and by reference number 145, the first network device (e.g., the packet forwarding component) may cause the packet to be forwarded toward the destination (e.g., the second endpoint device) associated with the packet. For example, the first network device may forward the packet to the second network device, and the second network device may forward the packet to the second endpoint device. In this way, communication may continue between the first endpoint device and the second endpoint device without being disrupted by packet tapping or monitoring operations. This improves network operations over a technique that inspects packets without copying the packets.

Figure 1F:
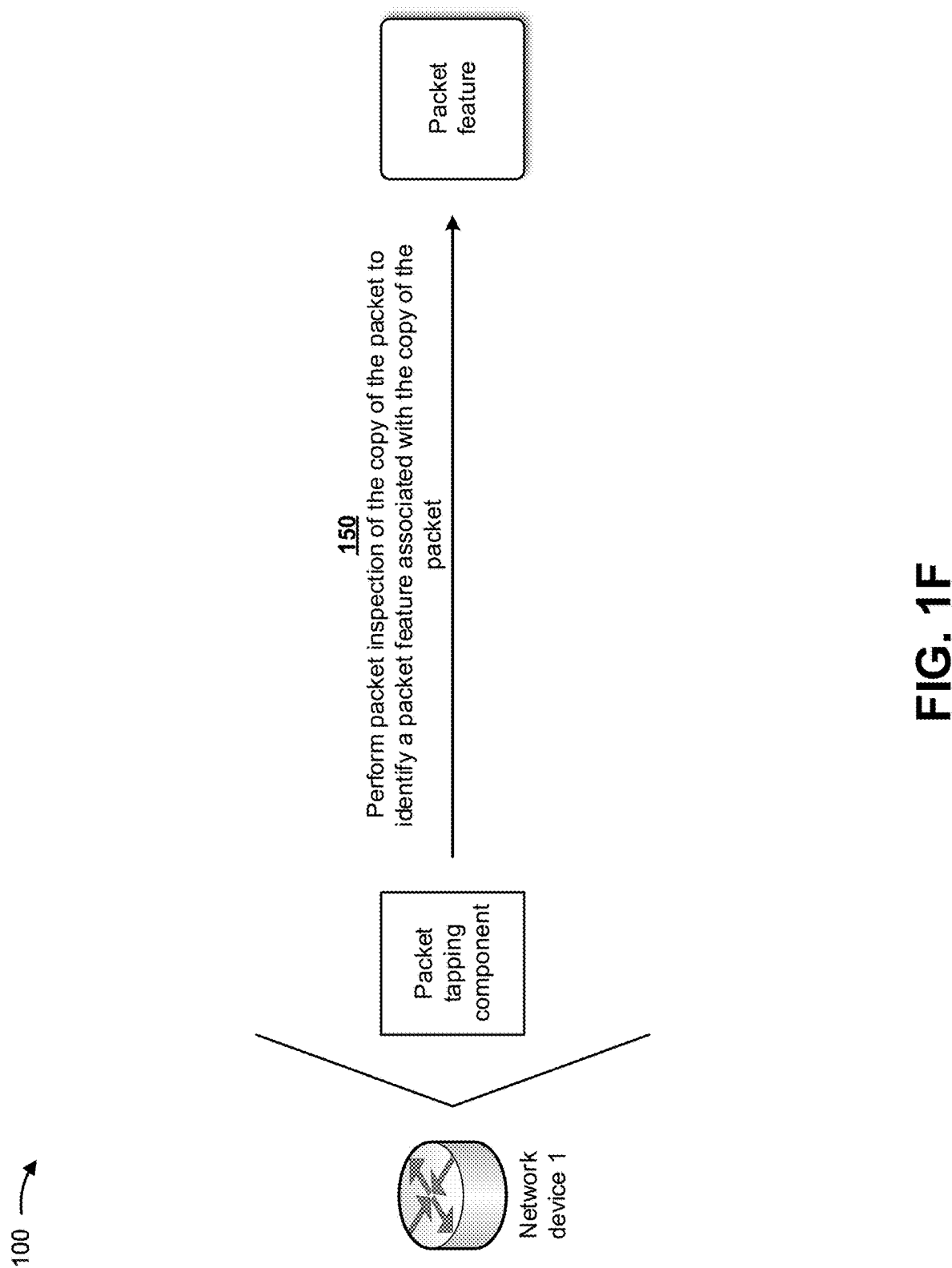

As shown in FIG. 1F, and by reference number 150, a packet tapping component of the first network device may perform packet inspection of the copy of the packet to identify a packet feature associated with the copy of the packet. Packet inspection may examine content of a packet passing through a network device and may make real-time decisions based on rules assigned by an entity (e.g., an Internet service provider (ISP), a network operator, a law enforcement authority, and/or the like), depending on the content of the packet. The packet feature may include a source IP address (e.g., an address of the first endpoint device), a destination IP address (e.g., an address of the second endpoint device), a source port (e.g., a port of the first endpoint device), a destination port (e.g., a port of the second endpoint device), and/or the like.

Figure 1G:
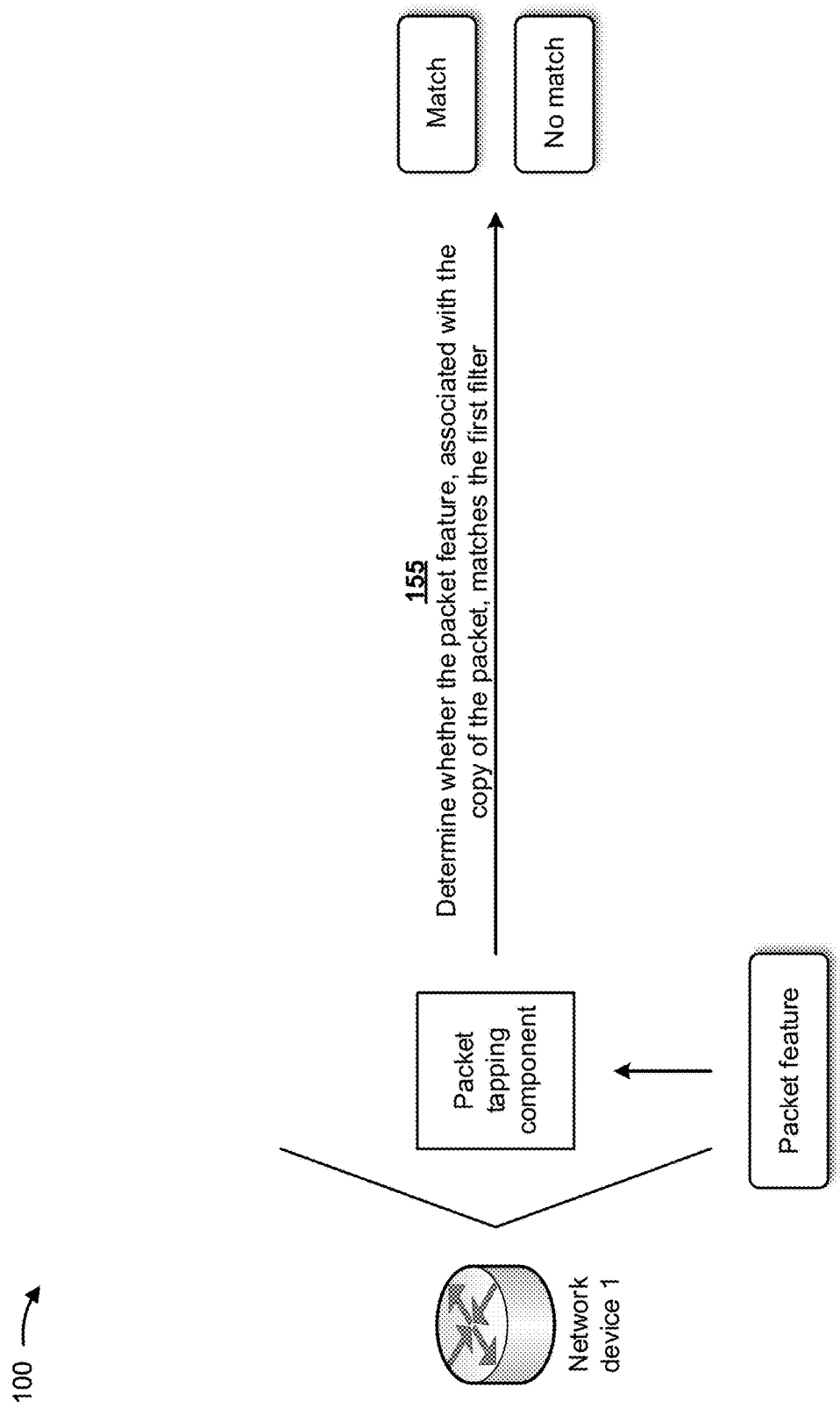

As shown in FIG. 1G, and by reference number 155, the packet tapping component of the first network device may determine whether the packet feature associated with the copy of the packet matches or corresponds to the first filter. In some implementations, the packet tapping component may determine that the packet feature matches or corresponds to the first filter when the packet feature matches one or more of the parameters of the first filter. For example, if the source IP address of the first endpoint device is the packet feature and the first filter includes a parameter identifying the source IP address of the first endpoint device, the packet tapping component may determine that the packet feature matches the first filter. Conversely, if the packet feature fails to match any of the parameters of the first filter, the packet tapping component may determine that the packet feature fails to match the first filter.

In some implementations, the packet tapping component may include an adaptive services physical interface card that is configured to perform packet tapping. Packet tapping may include monitoring traffic on a network in order to aid analysis of the network traffic. For example, a third party (e.g., a law enforcement authority) may wish to monitor traffic between two points in a network. If the network between the two points includes a network device, the network device may function as a network tap that enables the monitoring by the third party. Alternatively, if the network between the two points does not include a network device, a new network device may be installed between the two points as the network tap. For example, the packet tapping component of the first network device may compare information in the list of filters (e.g., which includes the first filter) with the copy of the packet, and may determine whether the packet feature associated with the copy of the packet matches or corresponds to the first filter. The packet tapping component may determine a match or a no match based on this determination.

Figure 1H:
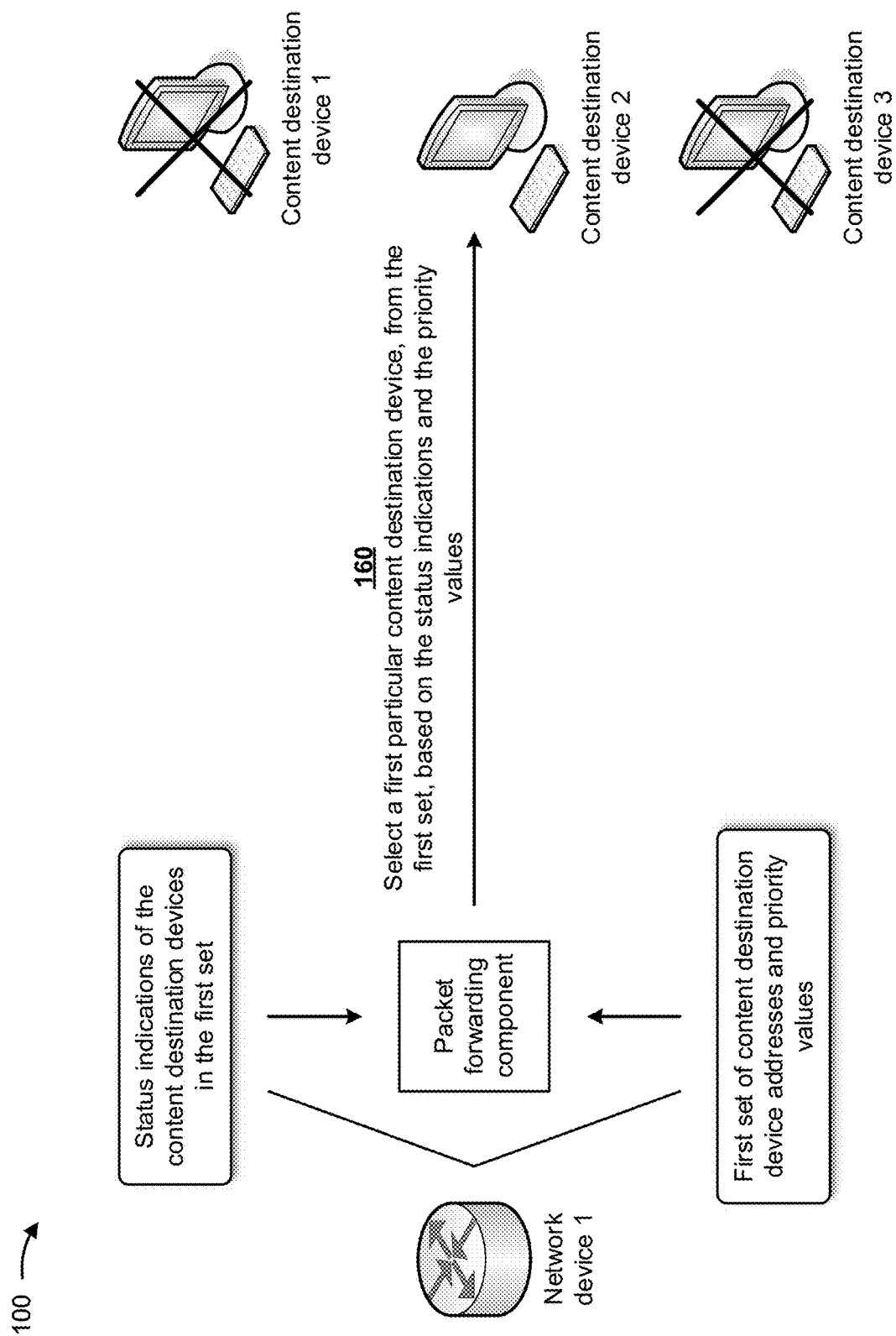

As shown in FIG. 1H, and by reference number 160, the packet forwarding component of the first network device may select a first particular content destination device, from the first set of content destination devices, based on the status indications and the priorities associated with the first set of content destination devices. In some implementations, the packet forwarding component may select the first particular content destination device based on the priority values associated with the first set of content destination devices. However, if a content destination device with a greatest priority value is unavailable (e.g., offline, experiencing high load conditions, and/or the like), the packet forwarding component may select a content destination device with a next greatest priority as compared to the first particular content destination device. If the content destination device with the greatest priority value becomes available (e.g., as indicated by a new status indication), the packet forwarding component may select (e.g., for future packets) the content destination device with the greatest priority as the first particular content destination device or may continue to utilize the previously-selected content destination device until the previously-selected content destination device becomes unavailable.

For example, as shown in FIG. 1H, the first content destination device and the third content destination device may be unavailable, as indicated by the status indications. The first content destination device may have a greatest priority value, the second content destination device may have a priority value less than the priority value of the first content destination device, and the third content destination device may have a priority value less than the priority value of the second content destination device. In such an example, the packet forwarding component of the first network device may select the second content destination device as the first particular content destination device.

As shown in FIG. 1I, and by reference number 165, if the packet feature associated with the copy of the packet matches or corresponds to the first filter, the packet tapping component of the first network device may cause the copy of the packet to be forwarded to the particular first content destination device (e.g., the second content destination device). As described above, a location (e.g., an address and/or a port) associated with the second content destination device may be provided with the request to add the first filter. The packet tapping component may utilize this location to cause the copy of the packet to be forwarded to the second content destination device. In some implementations, the packet tapping component of the first network device may cause the copy of the packet to be securely forwarded to the second content destination device via an encapsulation technique (e.g., Internet Protocol (IP)-User Datagram Protocol (UDP) encapsulation), may cause the copy of the packet to be securely forwarded to another network device connected to the second content destination device via an IP security tunnel, and/or the like.

In some implementations, if the packet feature associated with the copy of the packet fails to match or correspond to the first filter, the packet tapping component of the first network device may prevent the copy of the packet from being forwarded to the second content destination device. For example, the packet tapping component may cause the copy of the packet to be discarded and may not forward the copy of the packet to the second content destination device, conserving resources that would be wasted transmitting an unnecessary packet to a content destination device that will discard the packet.

In some implementations, if the status indications indicate that the first set of content destination devices are unavailable, the packet tapping component of the first network device may prevent the copy of the packet from being forwarded to the second content destination device. The first network device may then store the copy of the packet until the status indications indicate that at least one content destination device of the first set of content destination devices is available. When the at least one content destination device becomes available, the first network device may forward the copy of the packet to the at least one content destination device.

In some implementations, the second content destination device may be associated with a law enforcement authority authorized to perform lawful interception. For example, the second content destination device may be associated with a same law enforcement authority that is associated with the first mediation device that provided the request to install the first filter. In some implementations, the first mediation device and the second content destination device may be physically located on a same host system or device. Alternatively, the first mediation device and the second content destination device may be physically located on different host systems or devices. In some implementations, receipt of the copy of the packet may cause the second content destination device to analyze the copy of the packet.

Figure 1J:
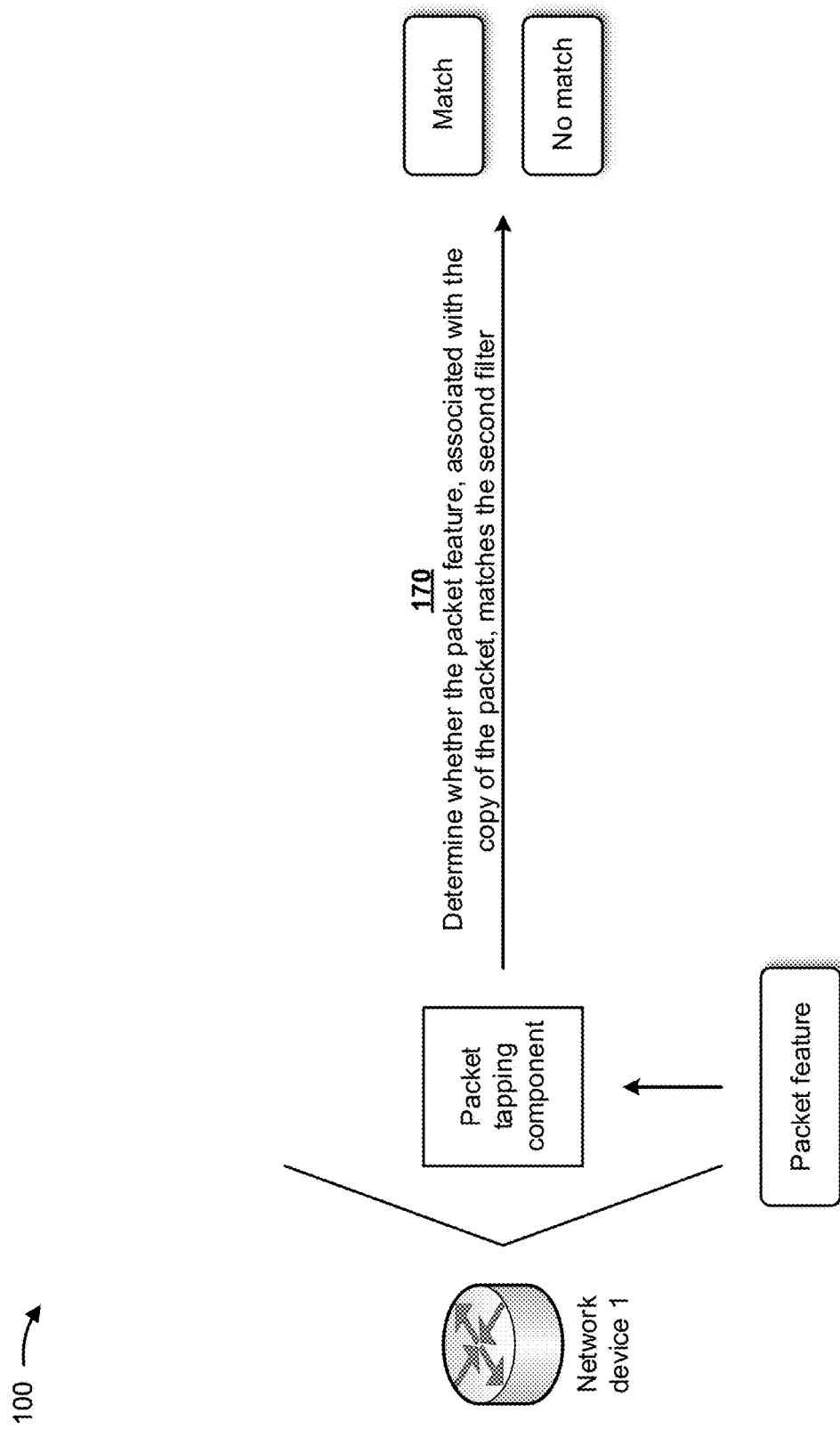

As shown in FIG. 1J, and by reference number 170, the packet tapping component of the first network device may determine whether the packet feature associated with the copy of the packet matches or corresponds to the second filter. For example, the packet tapping component of the first network device may compare information in the list of filters (e.g., which includes the second filter) with the copy of the packet, and may determine whether the packet feature associated with the copy of the packet matches or corresponds to the second filter. The packet tapping component may determine a match or a no match based on this determination.

Figure 1K:
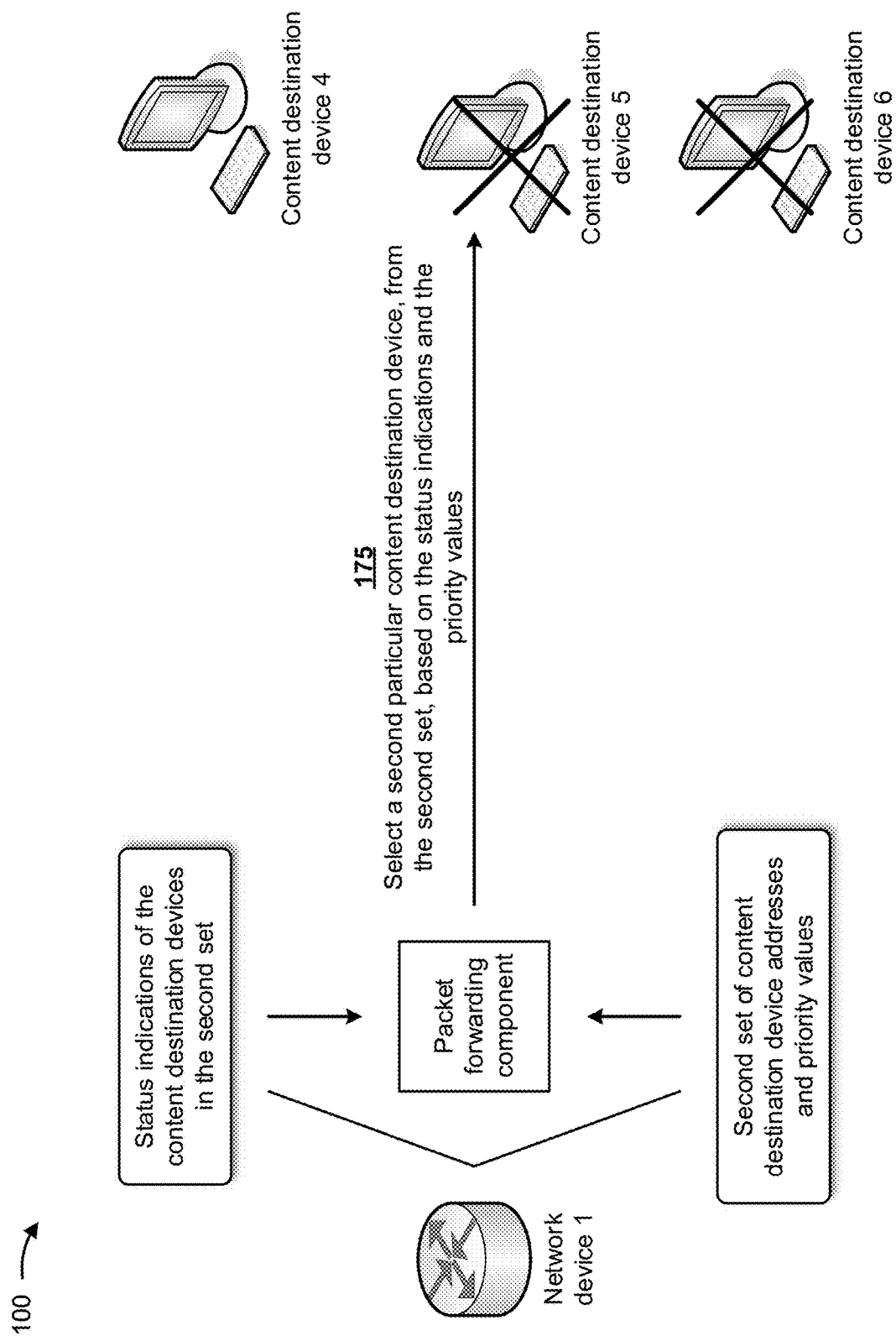

As shown in FIG. 1K, and by reference number 175, the packet forwarding component of the first network device may select a second particular content destination device, from the second set of content destination devices, based on the status indications and the priorities associated with the second set of content destination devices. In some implementations, the packet forwarding component may select the second particular content destination device based on the priority values associated with the second set of content destination devices. However, if a content destination device with a greatest priority value is unavailable (e.g., offline, experiencing high load conditions, and/or the like), the packet forwarding component may select a content destination device with a next greatest priority as the second particular content destination device. If the content destination device with the greatest priority value becomes available (e.g., as indicated by a new status indication), the packet forwarding component may select (e.g., for future packets) the content destination device with the greatest priority as the second particular content destination device.

For example, as shown in FIG. 1K, the fifth content destination device and the sixth content destination device may be unavailable as indicated by the status indications. The sixth content destination device may have a greatest priority value, the fifth content destination device may have a priority value less than the priority value of the sixth content destination device, and the fourth content destination device may have a priority value less than the priority value of the fifth content destination device. In such an example, the packet forwarding component of the first network device may select the fourth content destination device as the second particular content destination device since content destination devices with greater priority values are unavailable.

Figure 1L:
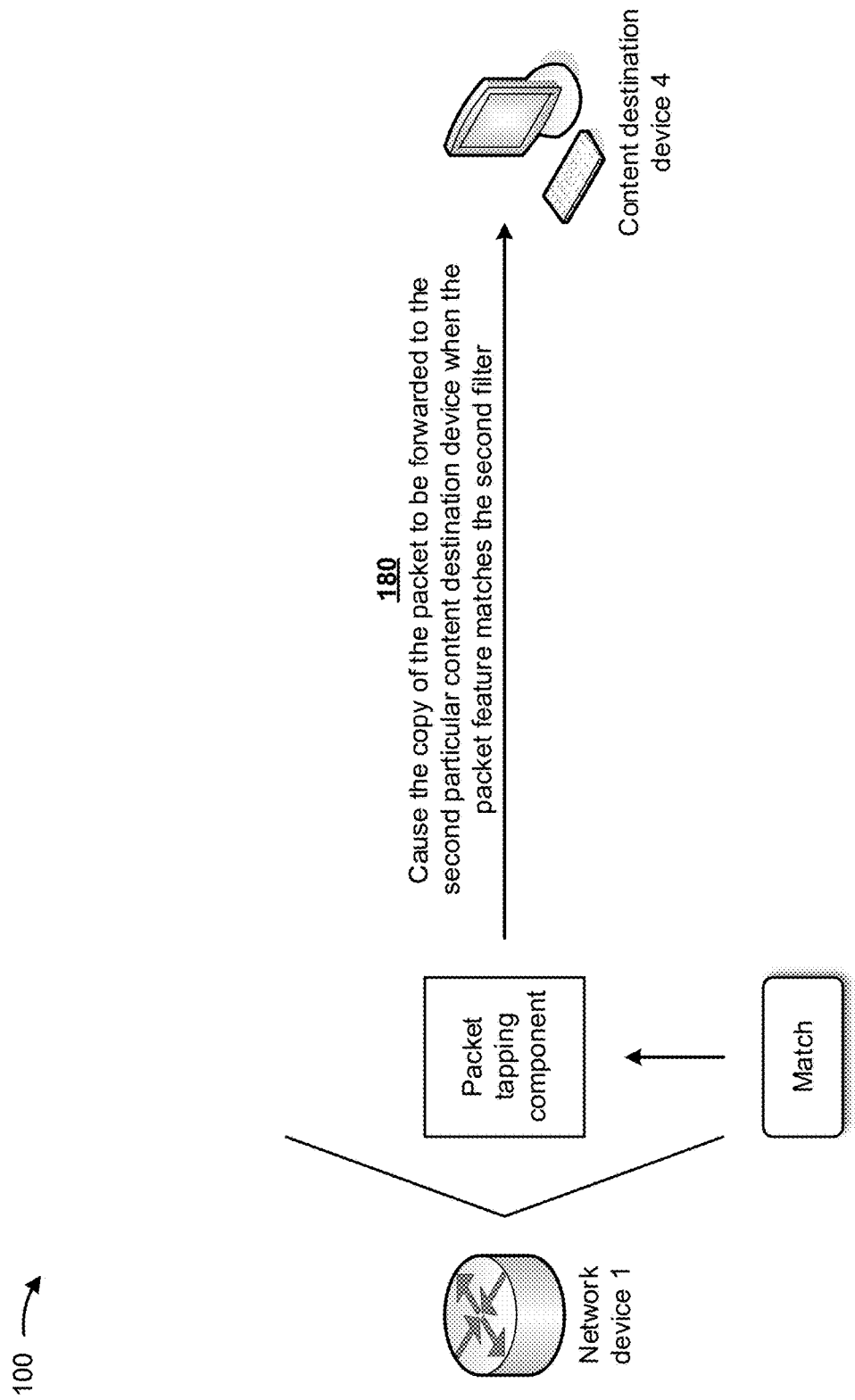

As shown in FIG. 1L, and by reference number 180, if the packet feature associated with the copy of the packet matches or corresponds to the second filter, the packet tapping component of the first network device may cause the copy of the packet to be forwarded to the second particular content destination device (e.g., the fourth content destination device). As described above, a location (e.g., an address and/or a port) associated with the fourth content destination device may be provided with the request to add the second filter. The packet tapping component may utilize this location to cause the copy of the packet to be forwarded to the fourth content destination device. In some implementations, the packet tapping component of the first network device may cause the copy of the packet to be securely forwarded to the fourth content destination device via an encapsulation technique (e.g., IP-UDP encapsulation), may cause the copy of the packet to be securely forwarded to another network device connected to the fourth content destination device via an IP security tunnel, and/or the like.

In some implementations, if the packet feature associated with the copy of the packet fails to match or correspond to the second filter, the packet tapping component of the first network device may prevent the copy of the packet from being forwarded to the fourth content destination device. For example, the packet tapping component may cause the copy of the packet to be discarded and may not forward the copy of the packet to the fourth content destination device.

In some implementations, if the status indications indicate that the second set of content destination devices are unavailable, the packet tapping component of the first network device may prevent the copy of the packet from being forwarded to the fourth content destination device. The first network device may then store the copy of the packet until the status indications indicate that at least one content destination device of the second set of content destination devices is available. When the at least one content destination device becomes available, the first network device may forward the copy of the packet to the at least one content destination device.

In some implementations, the fourth content destination device may be associated with a law enforcement authority authorized to perform lawful interception. For example, the fourth content destination device may be associated with a same law enforcement authority that is associated with the second mediation device that provided the request to install the second filter. In some implementations, the second mediation device and the fourth content destination device may be physically located on a same host system or device. Alternatively, the second mediation device and the fourth content destination device may be physically located on different host systems or devices. In some implementations, receipt of the copy of the packet may cause the fourth content destination device to analyze the copy of the packet.

Although implementations describe filtering based on filters, in some implementations, network traffic may be filtered based on other information, such as a user identifier, an end point device identifier, a network address (e.g., an IP address), an account identifier, transaction card identifier, and/or the like.

In some implementations, the packet tapping component may compare the copy of the packet to all filters included in the list of filters, and may generate additional copies of the packet if the copy of the packet matches more than one filter (e.g., as many copies of the packet as match to the filters). The first network device may then forward the multiple copies of the packet to respective content destination devices. Furthermore, hundreds or thousands of filters may be included in the list of filters, and the packet tapping component may compare the packet feature with each filter included in the list of filters. In some implementations, the packet tapping component may arrange the list of filters in a particular order that may enable efficient comparison of the packet feature with each filter. If the packet feature matches zero filters in the list of filters, the packet tapping component may discard the copy of the packet. If the packet feature matches more than one filter in the list of filters, the packet tapping component may make additional copies of the packet and may forward the copy of the packet and the additional copies of the packet to appropriate content destination devices.

In this way, network traffic may be intercepted for analysis and provided to an available content destination device based on availabilities and priorities associated with set of content destination devices, which reduces or prevents network devices from collecting traffic for an unavailable content destination device, filtering traffic that may be eventually lost, and/or the like. This conserves computing resources (e.g., processing resources, memory resources, and/or the like), communication resources, networking resources, and/or the like that would otherwise be wasted in collecting traffic for an unavailable content destination device, filtering traffic that may be eventually lost, and/or the like. Furthermore, implementations described herein use a rigorous, computerized process to perform tasks that were not previously performed. For example, currently there does not exist a technique that enables a network device to lawfully intercept traffic and provide the traffic to a content destination based on content destination availabilities and priorities.

As indicated above, FIGS. 1A-1L are provided merely as examples. Other examples may differ from what is described with regard to FIGS. 1A-1L.

Figure 2:
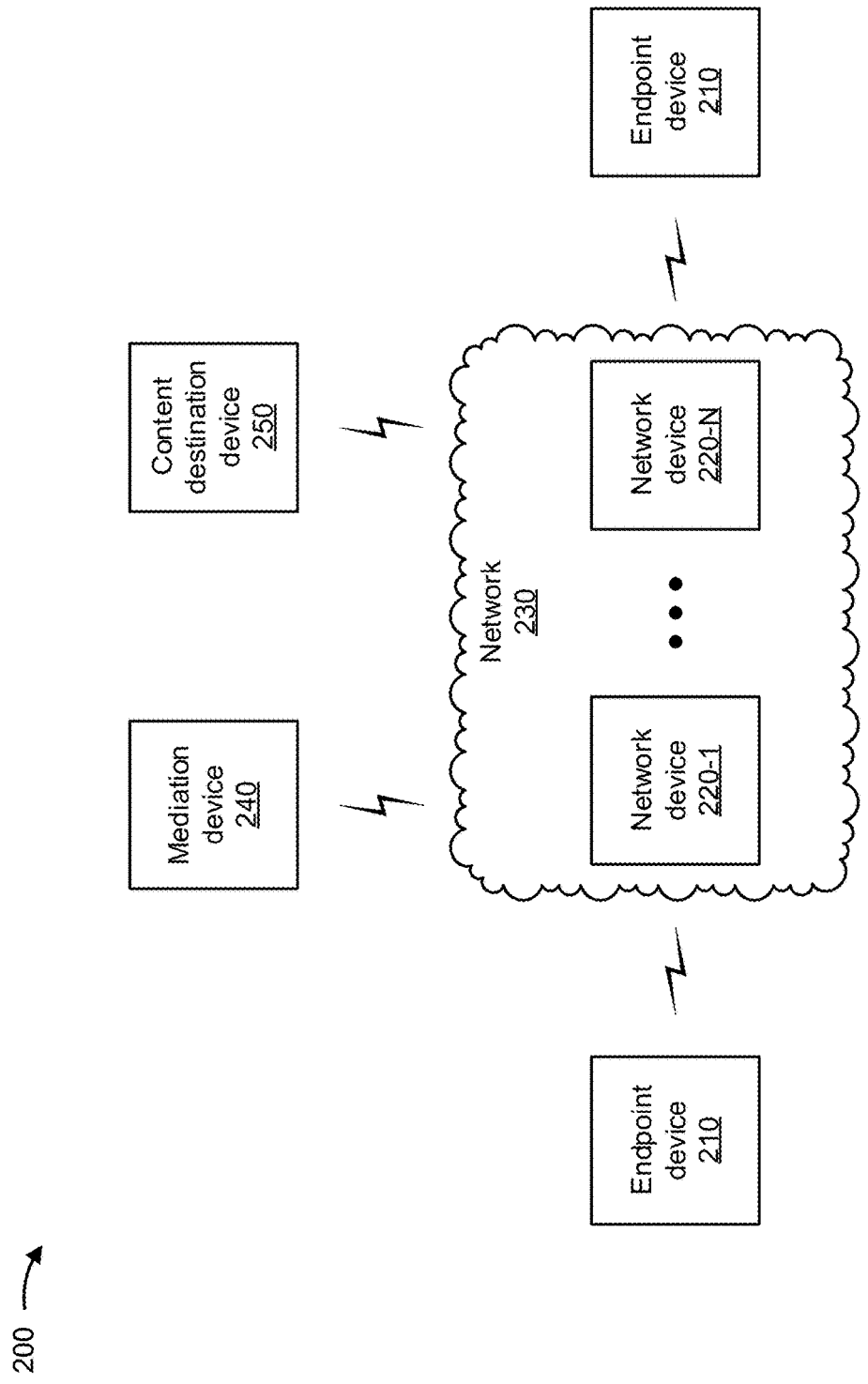
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include multiple endpoint devices 210, a group of network devices 220 (shown as network device 220-1 through network device 220-N), a network 230, a mediation device 240, and a content destination device 250. Devices of environment 200 may interconnect via wired connections, wireless connections, or a combination of wired and wireless connections.

Endpoint device 210 includes one or more devices capable of receiving, generating, storing, processing, and/or providing information, such as information described herein. For example, endpoint device 210 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like), a network device, or a similar type of device. In some implementations, endpoint device 210 may receive network traffic from and/or may provide network traffic to other endpoint devices 210, via network 230 (e.g., by routing packets using network devices 220 as intermediaries).

Network device 220 includes one or more devices capable of receiving, processing, storing, routing, and/or providing traffic (e.g., a packet, other information or metadata, and/or the like) in a manner described herein. For example, network device 220 may include a router, such as a label switching router (LSR), a label edge router (LER), an ingress router, an egress router, a provider router (e.g., a provider edge router, a provider core router, and/or the like), a virtual router, and/or the like. Additionally, or alternatively, network device 220 may include a gateway, a switch, a firewall, a hub, a bridge, a reverse proxy, a server (e.g., a proxy server, a cloud server, a data center server, and/or the like), a load balancer, and/or a similar device. In some implementations, network device 220 may be a physical device implemented within a housing, such as a chassis. In some implementations, network device 220 may be a virtual device implemented by one or more computer devices of a cloud computing environment or a data center. In some implementations, a group of network devices 220 may be a group of data center nodes that are used to route traffic flow through network 230.

Network 230 includes one or more wired and/or wireless networks. For example, network 230 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

Mediation device 240 includes one or more devices capable of receiving, generating, storing, processing, and/or providing information, such as information described herein. For example, mediation device 240 may include a laptop computer, a tablet computer, a desktop computer, a group of server devices, or a similar type of device. Mediation device 240 may be associated with one or more law enforcement authorities (e.g., police departments, government agencies, and/or the like) and may be utilized by the law enforcement authorities to request, from network 230, particular traffic that is to be monitored for the purpose of analysis and/or evidence. In some implementations, mediation device 240 may receive information from and/or transmit information to endpoint device 210 and/or content destination device 250.

Content destination device 250 includes one or more devices capable of receiving, generating, storing, processing, and/or providing information, such as information described herein. For example, content destination device 250 may include a laptop computer, a tablet computer, a desktop computer, a group of server devices, or a similar type of device. Content destination device 250 may be associated with one or more law enforcement authorities and may be utilized by the law enforcement authorities to receive, from network 230, particular traffic that is to be monitored for the purpose of analysis and/or evidence. In some implementations, content destination device 250 may receive information from and/or transmit information to endpoint device 210 and/or mediation device 240.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
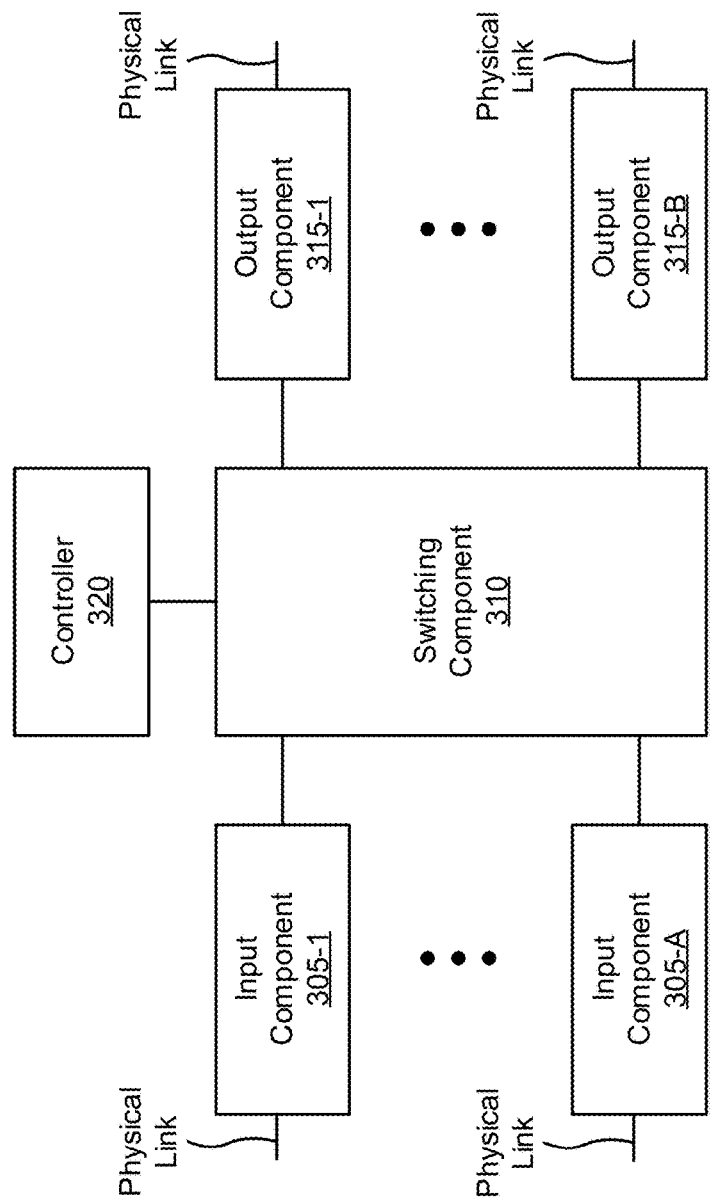
FIGS. 3 and 4 are diagrams of example components of one or more devices of FIG. 2.

FIG. 3 is a diagram of example components of a device 300. Device 300 may correspond to network device 220. In some implementations, network device 220 may include one or more devices 300 and/or one or more components of device 300. As shown in FIG. 3, device 300 may include one or more input components 305-1 through 305-A (A≥1) (hereinafter referred to collectively as input components 305, and individually as input component 305), a switching component 310, one or more output components 315-1 through 315-B (B≥1) (hereinafter referred to collectively as output components 315, and individually as output component 315), and a controller 320.

Input components 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., and input/output component may be a combination of input component 305 and output component 315).

Controller 320 includes a processor in the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor or processing component. The processor is implemented in hardware, firmware, and/or a combination of software and hardware. In some implementations, controller 320 may include one or more processors that can be programmed to perform a function.

In some implementations, controller 320 may include a random-access memory (RAM), a read only memory (ROM), and/or another type of dynamic or static storage device (e.g., a flash memory, a magnetic memory, an optical memory, and/or the like) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets. In some cases, controller 320 may create a session table based on information determined while initializing a link fault detection session and may forward the session table to input components 305 and/or output components 315.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
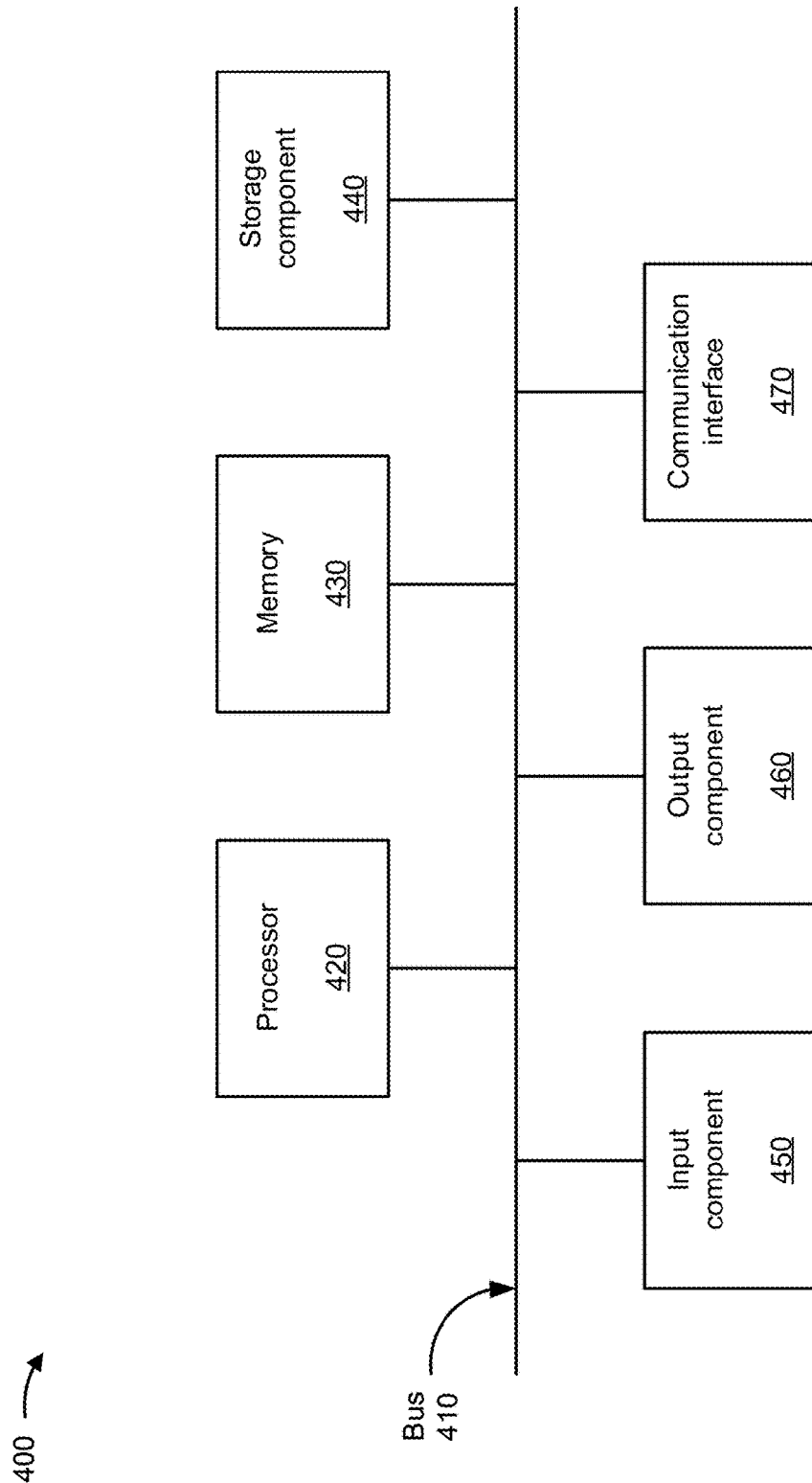

FIG. 4 is a diagram of example components of a device 400. Device 400 may correspond to endpoint device 210, network device 220, mediation device 240, and/or content destination device 250. In some implementations, endpoint device 210, network device 220, mediation device 240, and/or content destination device 250 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among the components of device 400. Processor 420 is implemented in hardware, firmware, or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random-access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a sensor for sensing information (e.g., a global positioning system (GPS) component, an accelerometer, a gyroscope, and/or an actuator). Output component 460 includes a component that provides output information from device 400 (e.g., a display, a speaker, and/or one or more light-emitting diodes (LEDs)).

Communication interface 470 includes a transceiver-like component (e.g., a transceiver and/or a separate receiver and transmitter) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, and/or the like.

Device 400 may perform one or more processes described herein. Device 400 may perform these processes based on processor 420 executing software instructions stored by a non-transitory computer-readable medium, such as memory 430 and/or storage component 440.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
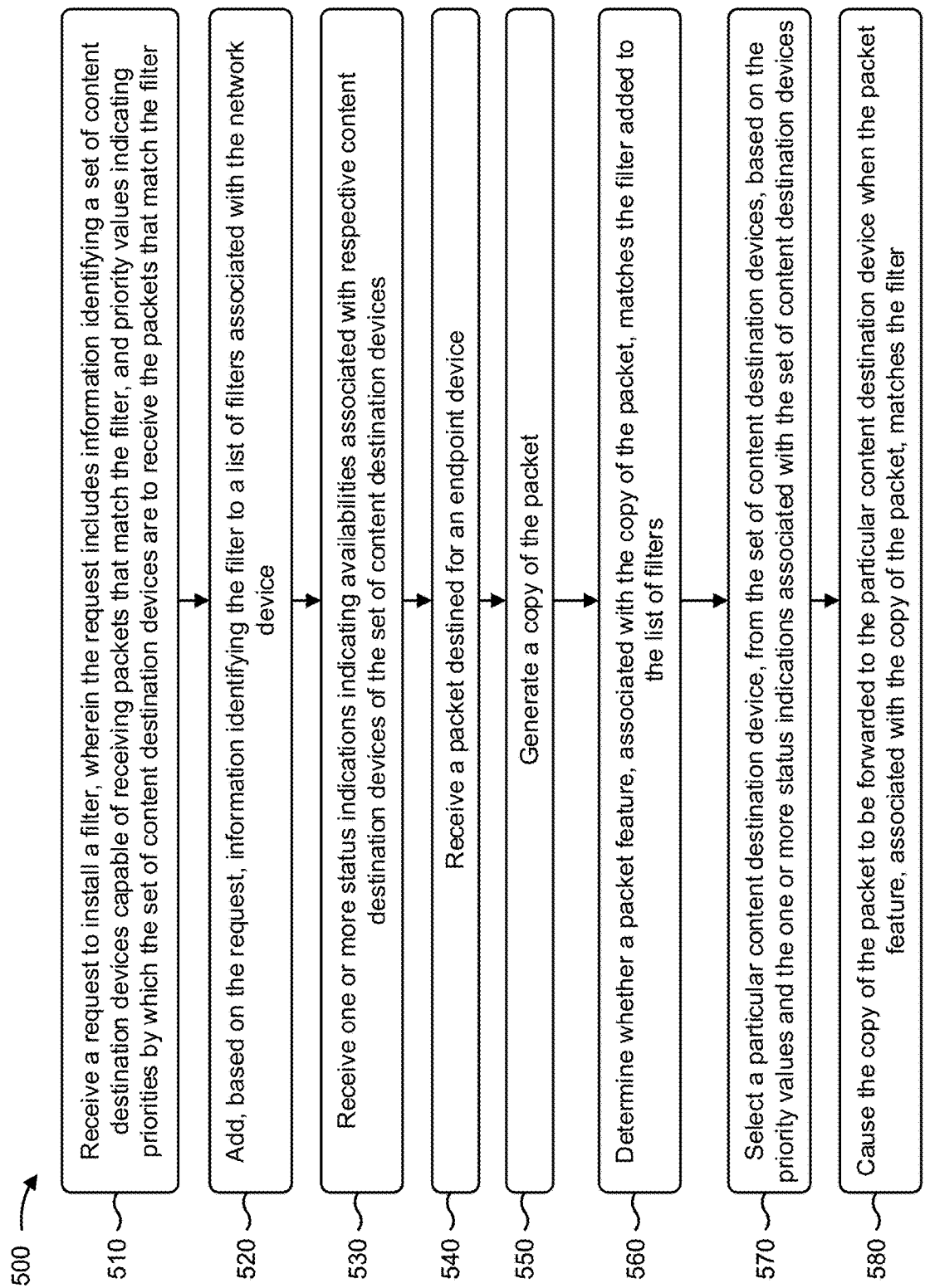

FIG. 5 is a flow chart of an example process 500 for lawfully intercepting traffic and providing the traffic to a content destination based on content destination availabilities and priorities. In some implementations, one or more process blocks of FIG. 5 may be performed by a network device (e.g., network device 220). In some implementations, one or more process blocks of FIG. 5 may be performed by another device or a group of devices separate from or including the network device, such as an endpoint device (e.g., endpoint device 210), a mediation device (e.g., mediation device 240), and/or a content destination device (e.g., content destination device 250).

As shown in FIG. 5, process 500 may include receiving a request to install a filter, wherein the request includes information identifying a set of content destination devices capable of receiving packets that match the filter, and priority values indicating priorities by which the set of content destination devices are to receive the packets that match the filter (block 510). For example, the network device (e.g., using input component 305, switching component 310, controller 320, processor 420, communication interface 470, and/or the like) may receive a request to install a filter, as described above. In some implementations, the request may include information identifying a set of content destination devices capable of receiving packets that match the filter, and priority values indicating priorities by which the set of content destination devices are to receive the packets that match the filter.

As further shown in FIG. 5, process 500 may include adding, based on the request, information identifying the filter to a list of filters associated with the network device (block 520). For example, the network device (e.g., using controller 320, processor 420, memory 430, and/or the like) may add, based on the request, information identifying the filter to a list of filters associated with the network device, as described above.

As further shown in FIG. 5, process 500 may include receiving one or more status indications indicating availabilities associated with respective content destination devices of the set of content destination devices (block 530). For example, the network device (e.g., using input component 305, switching component 310, controller 320, processor 420, communication interface 470, and/or the like) may receive one or more status indications indicating availabilities associated with respective content destination devices of the set of content destination devices, as described above.

As further shown in FIG. 5, process 500 may include receiving a packet destined for an endpoint device (block 540). For example, the network device (e.g., using input component 305, switching component 310, controller 320, processor 420, communication interface 470, and/or the like) may receive a packet destined for an endpoint device, as described above.

As further shown in FIG. 5, process 500 may include generating a copy of the packet (block 550). For example, the network device (e.g., using controller 320, processor 420, storage component 440, and/or the like) may generate a copy of the packet, as described above.

As further shown in FIG. 5, process 500 may include determining whether a packet feature, associated with the copy of the packet, matches the filter added to the list of filters (block 560). For example, the network device (e.g., using controller 320, processor 420, memory 430, and/or the like) may determine whether a packet feature, associated with the copy of the packet, matches the filter added to the list of filters, as described above.

As further shown in FIG. 5, process 500 may include selecting a particular content destination device, from the set of content destination devices, based on the priority values and the one or more status indications associated with the set of content destination devices (block 570). For example, the network device (e.g., using controller 320, processor 420, memory 430, storage component 440, and/or the like) may select a particular content destination device, from the set of content destination devices, based on the priority values and the one or more status indications associated with the set of content destination devices, as described above.

As further shown in FIG. 5, process 500 may include causing the copy of the packet to be forwarded to the particular content destination device when the packet feature, associated with the copy of the packet, matches the filter (block 580). For example, the network device (e.g., using switching component 310, output component 315, controller 320, processor 420, memory 430, communication interface 470, and/or the like) may cause the copy of the packet to be forwarded to the particular content destination device when the packet feature, associated with the copy of the packet, matches the filter, as described above.

Process 500 may include additional implementations, such as any single implementation or any combination of implementations described below and/or in connection with one or more other processes described elsewhere herein.

In a first implementation, process 500 may further include preventing the copy of the packet from being forwarded to the particular content destination device when the one or more status indications indicate that the set of content destination devices are unavailable, and storing the copy of the packet until the one or more status indications indicate that at least one content destination device of the set of content destination devices is available.

In a second implementation, alone or in combination with the first implementation, the request may include information identifying addresses of content destination devices included in the set of content destination devices.

In a third implementation, alone or in combination with one or more of the first and second implementations, receiving the one or more status indications may include providing, to the set of content destination devices, messages requesting the one or more status indications, wherein the messages are provided at predetermined time intervals, and receiving, from the set of content destination devices, the one or more status indications based on the messages.

In a fourth implementation, alone or in combination with one or more of the first through third implementations, selecting the particular content destination device, from the set of content destination devices, based on the priority values and the one or more status indications may include determining the availabilities of the set of content destination devices based on the one or more status indications; determining a subset of the set of content destination devices that are available; and selecting, as the particular content destination device, a content destination device with a greatest priority value from the subset of the set of content destination devices.

In a fifth implementation, alone or in combination with one or more of the first through fourth implementations, causing the copy of the packet to be forwarded to the particular content destination device may include causing the copy of the packet to be forwarded to the particular content destination device via Internet Protocol (IP)-User Datagram Protocol (UDP) encapsulation.

In a sixth implementation, alone or in combination with one or more of the first through fifth implementations, the copy of the packet may include one or more of signaling information, network management information, or content of communications.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
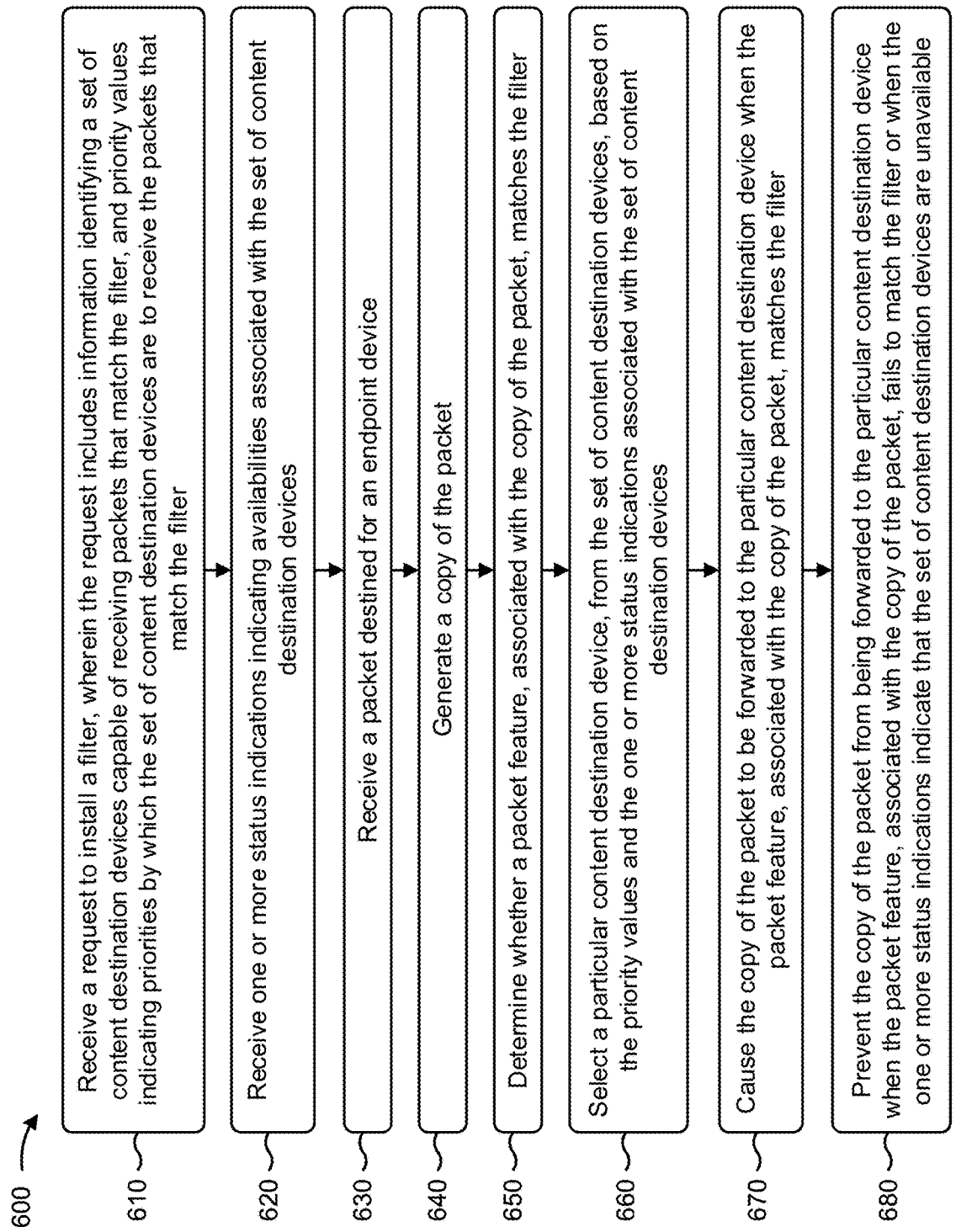

FIG. 6 is a flow chart of an example process 600 for lawfully intercepting traffic and providing the traffic to a content destination based on content destination availabilities and priorities. In some implementations, one or more process blocks of FIG. 6 may be performed by a network device (e.g., network device 220). In some implementations, one or more process blocks of FIG. 6 may be performed by another device or a group of devices separate from or including the network device, such as an endpoint device (e.g., endpoint device 210), a mediation device (e.g., mediation device 240), and/or a content destination device (e.g., content destination device 250).

As shown in FIG. 6, process 600 may include receiving a request to install a filter, wherein the request includes information identifying a set of content destination devices capable of receiving packets that match the filter, and priority values indicating priorities by which the set of content destination devices are to receive the packets that match the filter (block 610). For example, the network device (e.g., using input component 305, switching component 310, controller 320, processor 420, communication interface 470, and/or the like) may receive a request to install a filter, as described above. In some implementations, the request may include information identifying a set of content destination devices capable of receiving packets that match the filter, and priority values indicating priorities by which the set of content destination devices are to receive the packets that match the filter.

As further shown in FIG. 6, process 600 may include receiving one or more status indications indicating availabilities associated with the set of content destination devices (block 620). For example, the network device (e.g., using input component 305, switching component 310, controller 320, processor 420, communication interface 470, and/or the like) may receive one or more status indications indicating availabilities associated with the set of content destination devices, as described above.

As further shown in FIG. 6, process 600 may include receiving a packet destined for an endpoint device (block 630). For example, the network device (e.g., using input component 305, switching component 310, controller 320, processor 420, memory 430, communication interface 470, and/or the like) may receive a packet destined for an endpoint device, as described above.

As further shown in FIG. 6, process 600 may include generating a copy of the packet (block 640). For example, the network device (e.g., using controller 320, processor 420, memory 430, and/or the like) may generate a copy of the packet, as described above.

As further shown in FIG. 6, process 600 may include determining whether a packet feature, associated with the copy of the packet, matches the filter (block 650). For example, the network device (e.g., using input controller 320, processor 420, storage component 440, and/or the like) may determine whether a packet feature, associated with the copy of the packet, matches the filter, as described above.

As further shown in FIG. 6, process 600 may include selecting a particular content destination device, from the set of content destination devices, based on the priority values and the one or more status indications associated with the set of content destination devices (block 660). For example, the network device (e.g., using controller 320, processor 420, memory 430, and/or the like) may select a particular content destination device, from the set of content destination devices, based on the priority values and the one or more status indications associated with the set of content destination devices, as described above.

As further shown in FIG. 6, process 600 may include causing the copy of the packet to be forwarded to the particular content destination device when the packet feature, associated with the copy of the packet, matches the filter (block 670). For example, the network device (e.g., using switching component 310, output component 315, controller 320, processor 420, memory 430, interface 470, and/or the like) may cause the copy of the packet to be forwarded to the particular content destination device when the packet feature, associated with the copy of the packet, matches the filter, as described above.

As further shown in FIG. 6, process 600 may include preventing the copy of the packet from being forwarded to the particular content destination device when the packet feature, associated with the copy of the packet, fails to match the filter or when the one or more status indications indicate that the set of content destination devices are unavailable (block 680). For example, the network device (e.g., using controller 320, processor 420, storage component 440, and/or the like) may prevent the copy of the packet from being forwarded to the particular content destination device when the packet feature, associated with the copy of the packet, fails to match the filter or when the one or more status indications indicate that the set of content destination devices are unavailable, as described above.

Process 600 may include additional implementations, such as any single implementation or any combination of implementations described below and/or in connection with one or more other processes described elsewhere herein.

In a first implementation, causing the copy of the packet to be forwarded to the particular content destination device may include causing the copy of the packet to be forwarded to another network device connected to the particular content destination device via an Internet protocol (IP) security tunnel.

In a second implementation, alone or in combination with the first implementation, receiving the request to install the filter may include receiving the request to install the filter via a dynamic tasking control protocol (DTCP).

In a third implementation, alone or in combination with one or more of the first and second implementations, the request may not identify a mediation device associated with generation of the request.

In a fourth implementation, alone or in combination with one or more of the first through third implementations, the filter may include information identifying one or more of a source address associated with packets to be tapped, a destination address associated with packets to be tapped, a source port associated with packets to be tapped, or a destination port associated with packets to be tapped.

In a fifth implementation, alone or in combination with one or more of the first through fourth implementations, causing the copy of the packet to be forwarded to the particular content destination device may cause the particular content destination device to analyze the copy of the packet.

In a sixth implementation, alone or in combination with one or more of the first through fifth implementations, the packet feature may include information identifying one or more of a source address associated with the packet, a destination address associated with the packet, a source port associated with the packet, or a destination port associated with the packet.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a flow chart of an example process 700 for lawfully intercepting traffic and providing the traffic to a content destination based on content destination availabilities and priorities. In some implementations, one or more process blocks of FIG. 7 may be performed by a network device (e.g., network device 220). In some implementations, one or more process blocks of FIG. 7 may be performed by another device or a group of devices separate from or including the network device, such as an endpoint device (e.g., endpoint device 210), a mediation device (e.g., mediation device 240), and/or a content destination device (e.g., content destination device 250).

As shown in FIG. 7, process 700 may include receiving a request to install a filter, wherein the request includes information identifying a set of content destination devices capable of receiving packets that match the filter, and priority values indicating priorities by which the set of content destination devices are to receive the packets that match the filter (block 710). For example, the network device (e.g., using input component 305, switching component 310, controller 320, processor 420, communication interface 470, and/or the like) may receive a request to install a filter, as described above. In some implementations, the request may include information identifying a set of content destination devices capable of receiving packets that match the filter, and priority values indicating priorities by which the set of content destination devices are to receive the packets that match the filter.

As further shown in FIG. 7, process 700 may include receiving one or more status indications indicating availabilities associated with the set of content destination devices (block 720). For example, the network device (e.g., using input component 305, switching component 310, controller 320, processor 420, communication interface 470, and/or the like) may receive one or more status indications indicating availabilities associated with the set of content destination devices, as described above.

As further shown in FIG. 7, process 700 may include receiving a packet destined for an endpoint device (block 730). For example, the network device (e.g., using input component 305, switching component 310, controller 320, processor 420, memory 430, communication interface 470, and/or the like) may receive a packet destined for an endpoint device, as described above.

As further shown in FIG. 7, process 700 may include generating a copy of the packet (block 740). For example, the network device (e.g., using controller 320, processor 420, memory 430, and/or the like) may generate a copy of the packet, as described above.

As further shown in FIG. 7, process 700 may include determining whether a packet feature, associated with the copy of the packet, matches the filter (block 750). For example, the network device (e.g., using controller 320, processor 420, storage component 440, and/or the like) may determine whether a packet feature, associated with the copy of the packet, matches the filter, as described above.

As further shown in FIG. 7, process 700 may include selecting a particular content destination device, from the set of content destination devices, based on the priority values and the one or more status indications associated with the set of content destination devices (block 760). For example, the network device (e.g., using controller 320, processor 420, memory 430, and/or the like) may select a particular content destination device, from the set of content destination devices, based on the priority values and the one or more status indications associated with the set of content destination devices, as described above.

As further shown in FIG. 7, process 700 may include selectively performing a first action or a second action based on whether the packet feature, associated with the copy of the packet, matches the filter, wherein the first action includes causing the copy of the packet to be forwarded to the particular content destination device when the packet feature, associated with the copy of the packet, matches the filter, and wherein the second action includes preventing the copy of the packet from being forwarded to the particular content destination device when the packet feature, associated with the copy of the packet, fails to match the filter (block 770). For example, the network device (e.g., using switching component 310, output component 315, controller 320, processor 420, memory 430, storage component 440, communication interface 470, and/or the like) may selectively perform a first action or a second action based on whether the packet feature, associated with the copy of the packet, matches the filter, as described above. In some implementations, the first action may include causing the copy of the packet to be forwarded to the particular content destination device when the packet feature, associated with the copy of the packet, matches the filter, and the second action may include preventing the copy of the packet from being forwarded to the particular content destination device when the packet feature, associated with the copy of the packet, fails to match the filter.

Process 700 may include additional implementations, such as any single implementation or any combination of implementations described below and/or in connection with one or more other processes described elsewhere herein.

In a first implementation, the request may include information identifying addresses of content destination devices included in the set of content destination devices.

In a second implementation, alone or in combination with the first implementation, receiving the one or more status indications may include providing, to the set of content destination devices, messages requesting the one or more status indications, wherein the messages may be provided at predetermined time intervals; and receiving, from the set of content destination devices, the one or more status indications based on the messages.

In a third implementation, alone or in combination with one or more of the first and second implementations, selecting the particular content destination device from the set of content destination devices may include determining the availabilities of the set of content destination devices based on the one or more status indications; determining a subset of the set of content destination devices that are available; and selecting, as the particular content destination device, a content destination device with a greatest priority value from the subset of the set of content destination devices.

In a fourth implementation, alone or in combination with one or more of the first through third implementations, receiving the request to install the filter may include receiving the request to install the filter via a dynamic tasking control protocol (DTCP).

In a fifth implementation, alone or in combination with one or more of the first through fourth implementations, the packet feature may include information identifying one or more of a source address associated with the packet, a destination address associated with the packet, a source port associated with the packet, or a destination port associated with the packet.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    receiving, by a network device, a request to install a filter, wherein the request includes information identifying:
        a set of content destination devices capable of receiving packets that match the filter, and
        priority values indicating priorities by which the set of content destination devices are to receive the packets that match the filter;
    adding, by the network device and based on the request, information identifying the filter to a list of filters associated with the network device;
    receiving, by the network device, one or more status indications indicating availabilities associated with respective content destination devices of the set of content destination devices;
    receiving, by the network device, a packet destined for an endpoint device;
    generating, by the network device, a copy of the packet;
    forwarding, by the network device and concurrently with or after generating the copy of the packet, the packet to the endpoint device;
    determining, by the network device and based on information associated with the list of filters, whether a packet feature, of the copy of the packet, matches the filter;
    selecting, by the network device, a particular content destination device, from the set of content destination devices, based on the priority values and the one or more status indications associated with the set of content destination devices; and
    selectively performing, by the network device, and based on determining whether the packet feature matches the filter, one of:
        causing the copy of the packet to be forwarded to the particular content destination device when the packet feature, of the copy of the packet, matches the filter, and
        discarding the copy of the packet when the packet feature, of the copy of the packet, does not match the filter.

2. The method of claim 1, further comprising:
    preventing the copy of the packet from being forwarded to the particular content destination device when the one or more status indications indicate that the set of content destination devices are unavailable; and
    storing the copy of the packet until the one or more status indications indicate that at least one content destination device of the set of content destination devices is available.

3. The method of claim 1, wherein the request includes information identifying addresses of content destination devices included in the set of content destination devices.

4. The method of claim 1, where receiving the one or more status indications comprises:
    providing, to the set of content destination devices, messages requesting the one or more status indications,
        wherein the messages are provided at predetermined time intervals; and
    receiving, from the set of content destination devices, the one or more status indications based on the messages.

5. The method of claim 1, wherein selecting the particular content destination device, from the set of content destination devices, based on the priority values and the one or more status indications comprises:
    determining the availabilities associated with the respective content destination devices of the set of content destination devices based on the one or more status indications;
    determining a subset of the set of content destination devices that are available; and
    selecting, as the particular content destination device, a respective content destination device, of the set of content destination devices, with a greatest priority value from the subset of the set of content destination devices.

6. The method of claim 1, wherein the copy of the packet includes one or more of:
    signaling information,
    network management information, or
    content of communications.

7. A network device, comprising:
    one or more memories; and
    one or more processors configured to:
        receive a request to install a filter,
            wherein the request includes information identifying:
                a set of content destination devices capable of receiving packets that match the filter, and
                priority values indicating priorities by which the set of content destination devices are to receive the packets that match the filter;
        receive one or more status indications indicating availabilities associated with the set of content destination devices;
        receive a packet destined for an endpoint device;
        generate a copy of the packet;
        forward, concurrently with or after generating the copy of the packet, the packet to the endpoint device;
        determine whether a packet feature, of the copy of the packet, matches the filter;
        select a particular content destination device, from the set of content destination devices, based on the priority values and the one or more status indications associated with the set of content destination devices;

cause the copy of the packet to be forwarded to the particular content destination device when the packet feature, of the copy of the packet, matches the filter; and prevent the copy of the packet from being forwarded to the particular content destination device when the packet feature, of the copy of the packet, fails to match the filter or when the one or more status indications indicate that the set of content destination devices are unavailable, wherein preventing the copy of the packet from being forwarded to the particular content destination device comprises discarding the copy of the packet.

8. The network device of claim 7, wherein the one or more processors, when causing the copy of the packet to be forwarded to the particular content destination device, are to:

cause the copy of the packet to be forwarded to another network device connected to the particular content destination device via an Internet protocol (IP) security tunnel.

9. The network device of claim 7, wherein the one or more processors, when receiving the request to install the filter, are to:

receive the request to install the filter via a dynamic tasking control protocol (DTCP).

10. The network device of claim 7, wherein the request does not identify a mediation device associated with generation of the request.

11. The network device of claim 7, wherein the filter includes information identifying one or more of:

a source address associated with packets to be tapped,
a destination address associated with packets to be tapped,
a source port associated with packets to be tapped, or
a destination port associated with packets to be tapped.

12. The network device of claim 7, wherein causing the copy of the packet to be forwarded to the particular content destination device causes the particular content destination device to analyze the copy of the packet.

13. The network device of claim 7, wherein the packet feature includes information identifying one or more of:

a source address associated with the packet,
a destination address associated with the packet,
a source port associated with the packet, or
a destination port associated with the packet.

14. A non-transitory computer-readable medium storing instructions, the instructions comprising:

one or more instructions that, when executed by one or more processors of a network device, cause the one or more processors to:

receive a request to install a filter,
wherein the request includes information identifying:
a set of content destination devices capable of receiving packets that match the filter, and
priority values indicating priorities by which the set of content destination devices are to receive the packets that match the filter;

receive one or more status indications indicating availabilities associated with the set of content destination devices;

receive a packet destined for an endpoint device;
generate a copy of the packet;

forward, concurrently with or after generating the copy of the packet, the packet to the endpoint device;

determine whether a packet feature, of the copy of the packet, matches the filter;

select a particular content destination device, from the set of content destination devices, based on the priority values and the one or more status indications associated with the set of content destination devices; and selectively perform a first action or a second action based on whether the packet feature, of the copy of the packet, matches the filter, wherein the first action includes causing the copy of the packet to be forwarded to the particular content destination device when the packet feature, of the copy of the packet, matches the filter, and wherein the second action includes preventing the copy of the packet from being forwarded to the particular content destination device when the packet feature, of the copy of the packet, fails to match the filter, wherein preventing the copy of the packet from being forwarded to the particular content destination device comprises discarding the copy of the packet.

15. The non-transitory computer-readable medium of claim 14, wherein the request includes information identifying addresses of content destination devices included in the set of content destination devices.

16. The non-transitory computer-readable medium of claim 14, where the one or more instructions, that cause the one or more processors to receive the one or more status indications, cause the one or more processors to:

provide, to the set of content destination devices, messages requesting the one or more status indications,
wherein the messages are provided at predetermined time intervals; and receive, from the set of content destination devices, the one or more status indications based on the messages.

17. The non-transitory computer-readable medium of claim 14, wherein the one or more instructions, that cause the one or more processors to select the particular content destination device from the set of content destination devices, cause the one or more processors to:

determine the availabilities of one or more content destination devices included in the set of content destination devices based on the one or more status indications;

determine a subset of the set of content destination devices that are available; and select, as the particular content destination device, a content destination device with a greatest priority value from the subset of the set of content destination devices.

18. The non-transitory computer-readable medium of claim 14, wherein the packet feature includes information identifying one or more of:

a source address associated with the packet,
a destination address associated with the packet,
a source port associated with the packet, or
a destination port associated with the packet.

19. The method of claim 1, wherein selecting the particular content destination device, from the set of content destination devices, based on the priority values and the one or more status indications comprises:

selecting, as the particular content destination device, a content destination device with a greatest priority value from the set of content destination devices.

20. The method of claim 1, wherein the filter is a first filter, and
- wherein one or more additional copies of the packet are generated when the packet feature, of the copy of the packet, matches one or more second filters of the list of filters,
- wherein a first quantity of the one or more additional copies of the packet is based on a second quantity of the matching one or more second filters, and
- wherein the one or more additional copies of the packet are forwarded to respective content destination devices associated with the one or more second filters.

* * * * *